(12) United States Patent
Schilders et al.

(10) Patent No.: US 12,373,496 B2
(45) Date of Patent: Jul. 29, 2025

(54) SYSTEM AND METHOD FOR EXECUTING SEARCHES USING DIRECTED PROPERTY GRAPHS

(71) Applicant: INFOSYS LIMITED, Bangalore (IN)

(72) Inventors: Steven Schilders, Columbus, IN (US); Kaustubh Kishor Madke, Burnaby (CA)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 18/440,527

(22) Filed: Feb. 13, 2024

(65) Prior Publication Data

US 2024/0330370 A1    Oct. 3, 2024

Related U.S. Application Data

(60) Provisional application No. 63/455,642, filed on Mar. 30, 2023.

(51) Int. Cl.
| | |
|---|---|
| *G06F 17/00* | (2019.01) |
| *G06F 7/00* | (2006.01) |
| *G06F 16/901* | (2019.01) |
| *G06F 16/903* | (2019.01) |
| *G06F 21/60* | (2013.01) |

(52) U.S. Cl.
CPC .... *G06F 16/90335* (2019.01); *G06F 16/9024* (2019.01); *G06F 21/602* (2013.01)

(58) Field of Classification Search
CPC .......... G06F 16/90335; G06F 16/9024; G06F 21/602
USPC ........................................................ 707/741
See application file for complete search history.

(56) References Cited

U.S. PATENT DOCUMENTS

| | | | | |
|---|---|---|---|---|
| 8,732,208 | B2 * | 5/2014 | Lee ...................... | G06F 16/9024 707/798 |
| 8,751,521 | B2 * | 6/2014 | Lee ...................... | G06F 16/9538 707/767 |
| 2011/0078166 | A1 * | 3/2011 | Oliver ................... | G06F 16/953 707/769 |
| 2012/0197834 | A1 * | 8/2012 | Panigrahy .............. | G06Q 50/01 706/52 |
| 2013/0191372 | A1 * | 7/2013 | Lee ......................... | H04L 51/52 707/769 |
| 2021/0049171 | A1 * | 2/2021 | Ziauddin .............. | G06F 16/9024 |
| 2022/0343780 | A1 * | 10/2022 | Miller .................. | G06F 3/04886 |

* cited by examiner

*Primary Examiner* — Pavan Mamillapalli
(74) *Attorney, Agent, or Firm* — Finnegan, Henderson, Farabow, Garrett & Dunner LLP

(57) ABSTRACT

A system for executing a search in a dataset is provided. The system includes a storage element that stores a directed property graph derived from the dataset. The directed property graph includes entity vertices corresponding to entities of the dataset, edges corresponding to properties of the entities, and value vertices corresponding to data values of the properties. Each edge couples an entity vertex to a value vertex and includes a label indicating an association therebetween. The system further includes processing circuitry that receives a search query including a reference value. The processing circuitry identifies a value vertex having a data value that is associated with the reference value and generates a response to the search query based on labels of edges coupled to the value vertex, and entities of the dataset represented by entity vertices coupled to the value vertex by way of the edges.

19 Claims, 13 Drawing Sheets

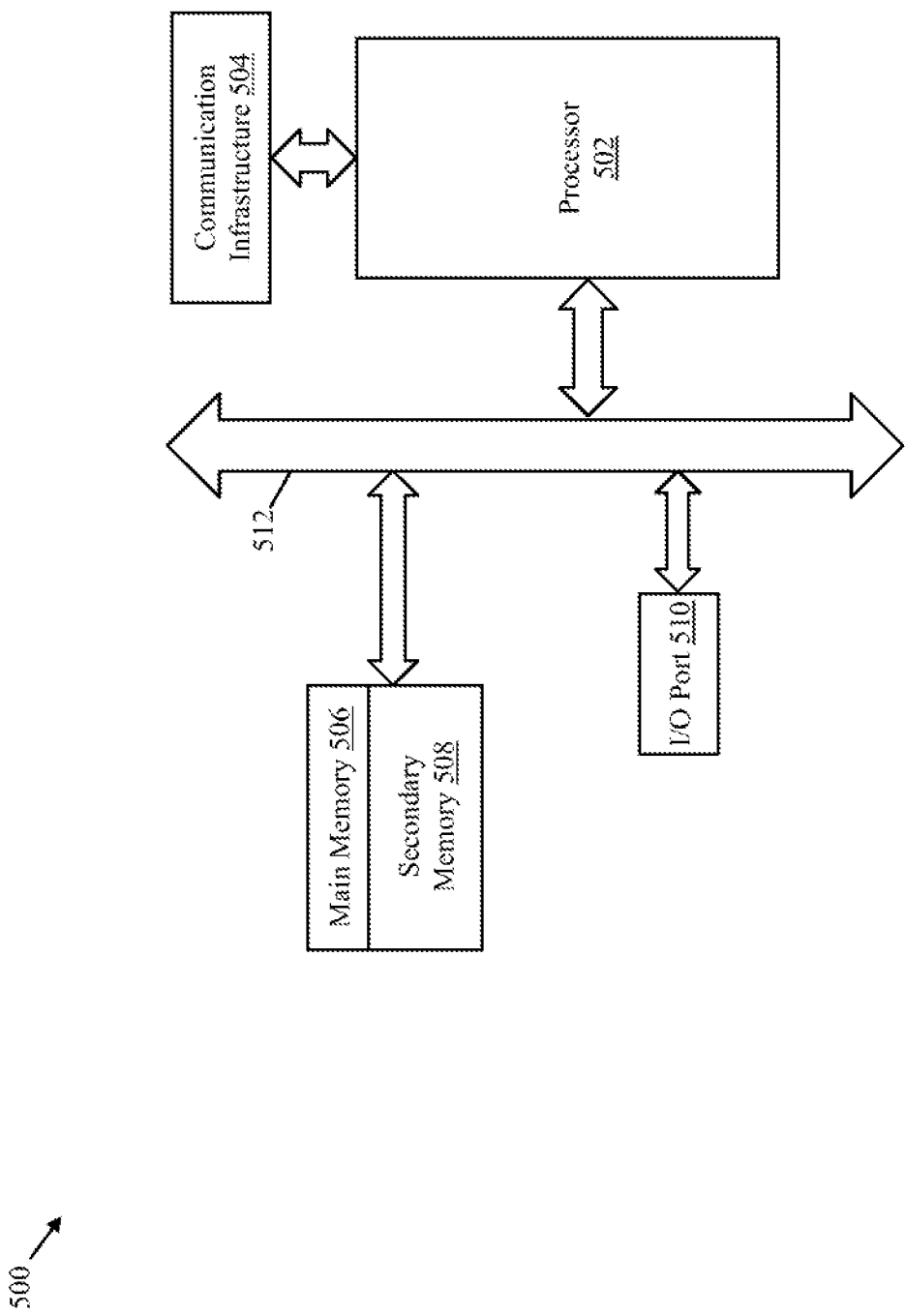

SYSTEM AND METHOD FOR EXECUTING SEARCHES USING DIRECTED PROPERTY GRAPHS

CROSS-REFERENCE TO RELATED APPLICATIONS

This patent application refers to, claims priority to, and claims the benefit of U.S. Provisional Application Ser. No. 63/455,642, filed Mar. 30, 2023, the contents of which are hereby incorporated herein by reference in its entirety.

FIELD

Various embodiments of the present disclosure relate generally to searching in datasets. More specifically, various embodiments of the present disclosure relate to systems and methods for executing searches using directed property graphs.

BACKGROUND

Along with exponential development in the field of technology came an enormous demand for storing, retrieving, and analyzing data. Conventional database management systems (for example, relational database management systems, graph-based databases, or the like) are commonly utilized for the storage and management of datasets. The conventional database management systems typically execute information searches therein. An information search is executed when a response to the search is defined by a context. Hence, the information search leads to the retrieval of all records associated with a data value in a search query with respect to a specific context of the data value. However, searching in the dataset is not limited to information searches, and quite often, data searches are required to be executed. A data search is not limited by context. Hence, the execution of the data search leads to the retrieval of all records associated with the searched data value regardless of the context thereof. Executing data searches in conventional database management systems may not be feasible. Further, conventional database management systems are vulnerable to attacks as they have homogeneous security architecture that provides a single layer of security.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for executing secure and performant data and information searches using directed property graphs are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

FIG. 5 is a block diagram that illustrates a system architecture of a computer system for facilitating the execution of the search in the dataset, in accordance with an embodiment of the present disclosure;

DETAILED DESCRIPTION

Figure 1:
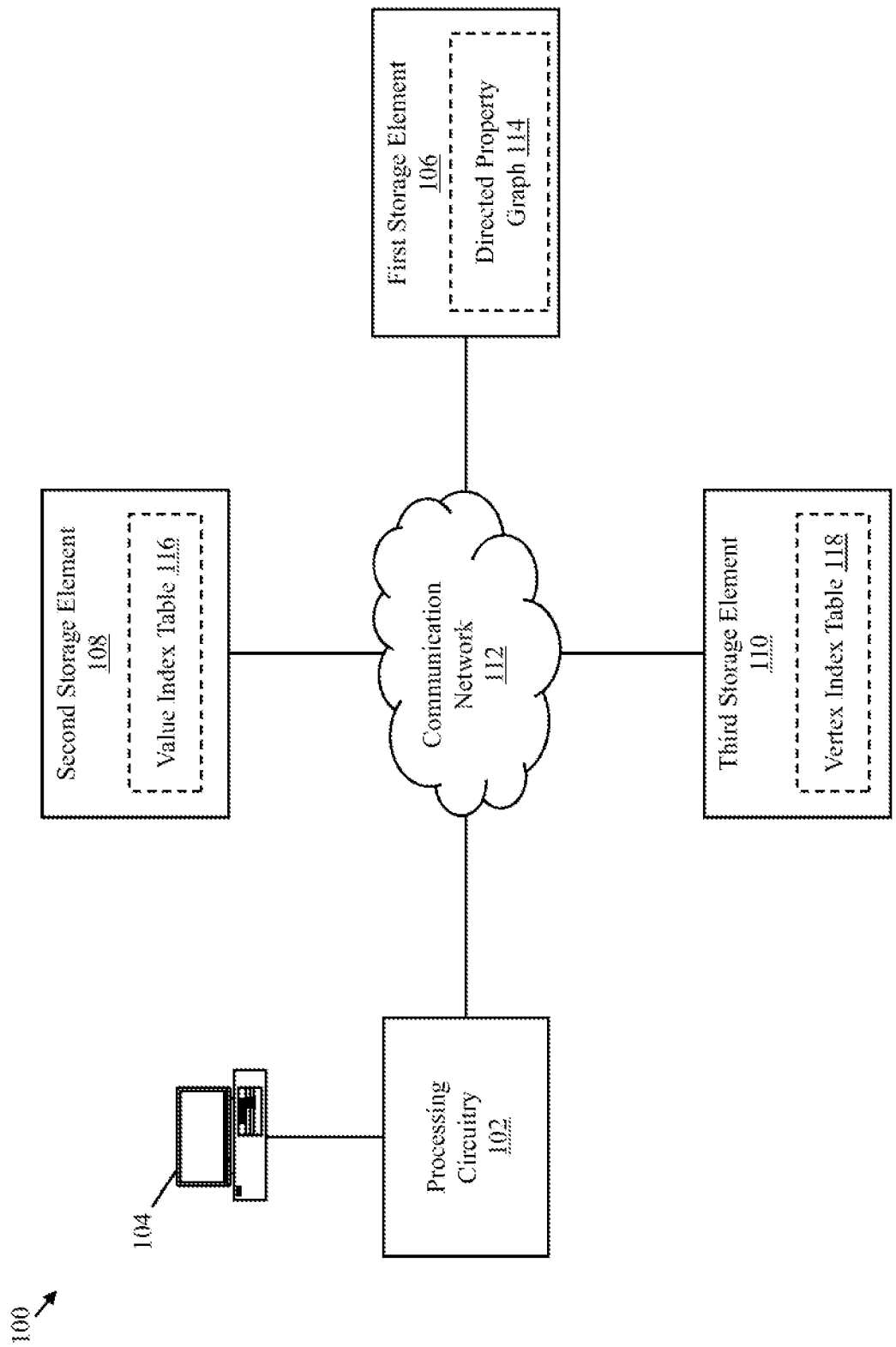
FIG. 1 is a block diagram that illustrates a system environment for executing a search in a dataset, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview

A relational database management system (RDBMS) stores data in the form of multiple tables. Each table corresponds to an entity associated with a dataset. Each table column corresponds to an entity property, whereas, each entity instance value is mapped as a row in the table. Thus, the rows of the table correspond to properties associated with the entity and the columns correspond to property values (e.g., data values) of the properties. For example, a dataset of employees may have 'Employee Address' as an entity, and 'ID', 'House Name', 'Street', 'City', 'Country', and 'Pin code' as properties stored as columns of an 'Employee Address' table. Each entity in the dataset has corresponding property values stored as a row of the 'Employee Address' table. The employees' dataset may further have separate tables for entities such as 'Employee Name', 'Employee Type', or the like. The aforementioned entities may be hierarchically connected to a parent entity table titled 'Employee' that includes a row that identifies child tables for example, 'Employee 1', 'Employee 2', or the like, by way of separate foreign key joins to corresponding child tables. The parent entity table may also have associated properties and property values. On the other hand, the conventional directed property graph (e.g., the graph-based database) stores an entity in the form of a vertex of a graph. In such cases, each vertex includes various attributes and corresponding attribute values stored therein. As mentioned earlier, in the RDBMS, each row represents a unique record associated with a corresponding entity. In the conventional directed property graph, each unique record of the 'Employee Address' table forms the vertex, and 'ID', 'House, 'Street', 'City', 'Country', and 'Pin code', along with the corresponding attribute values, are included as property and property values, respectively, stored at the vertex. Similarly, 'Employee Name' and 'Employee Type' may form other vertices, with all three vertices connected to a parent vertex titled 'Employee 1' by way of respective edges. Similar structures, in both the RDBMS and the conventional directed property graph, may be created for records of other employees.

In both the aforementioned scenarios, to execute a data search (e.g., to search for a data value), each column of each table or each attribute of each vertex is required to be searched. For example, to search for a data value of 'Washington', each column of each table or each property of each entity vertex is required to be searched, as properties/attributes for 'Washington' may include house name, street name, city name, employee name, or the like. This form of data search takes up a significant amount of time and in some scenarios may not even be feasible. Thus, the above-mentioned databases provide a complex and inefficient solution for executing data searches.

Additionally, data stored in the RDBMS and the conventional directed property graph could be sensitive and confidential, and hence, may require to be secured from unauthorized access and attacks from malicious users. Conventionally, the RDBMS and the conventional directed property graph may be secured by encrypting the whole database with the same security key, however, breaching such security requires only a single level of decryption and leaves the data vulnerable. Alternatively, the RDBMS and the conventional directed property graph may be secured by encrypting each data value stored therein. Whilst such an approach ensures data security, it adds a time burden on wildcard searches (e.g., queries requiring similar but not exact matches), as each encrypted value would have to be decrypted and compared with the reference data values that are to be searched. Therefore, these conventional approaches for database management prove to be inefficient in fulfilling current operational and security requirements.

The present disclosure presents a unique graph-based approach for storing and managing data in a way that leads to optimized data search operations and security. The present disclosure discloses an approach for storing and managing data using a directed property graph. The directed property graph disclosed herein is derived from a dataset including multiple entities, their associated properties, and corresponding data values. The directed property graph stores raw data values (i.e., attribute values) as value vertices (i.e., leaf vertices), with each value vertex including a unique data value. Each data value at the value vertex is associated with an entity vertex by way of an edge that is indicative of a relationship between the entity vertex and the data value. The edge includes a label, akin to the property of the entity, to describe the relationship between the entity vertex and the value vertex. Multiple entity vertices may be further associated with a parent entity vertex by separate edges. Thus, in the abovementioned example, 'Employee 1' may be the parent entity vertex, and 'Employee Name', 'Employee Address', and 'Employee Type' may be child entity vertices. Further, the 'Employee Address' entity vertex may include edges labeled 'has ID', 'has house name', 'has street', 'has state', 'has country', and 'has pin code' that are connected to value vertices having the corresponding data values (e.g., 'A1', 'Royal Enclave', 'Baker', 'Washington', 'United States of America', and '20005', respectively). Additionally, the 'Employee 1' parent entity vertex may include various edges linking the vertex to corresponding value vertices. In the ongoing example, 'Employee 2' may be another parent entity vertex to an entity vertex 'Employee Name' that is associated with a value vertex representing the data value 'Washington'. Therefore, the value vertex 'Washington' may be associated with (i) the entity vertex 'Employee Name' of the parent entity vertex 'Employee 2' via the edge 'has last name' and (ii) the entity vertex 'Employee Address' of the parent entity vertex 'Employee 1' via the edge 'has state'. Such a directed property graph may be utilized for executing data searches, information searches, etc., in an optimal manner. Data search leads to retrieval of all records associated with searched data value regardless of context thereof, whereas, information search leads to retrieval of records associated with searched data with respect to a specific context.

While executing a data search on the directed property graph, a search query is received by processing circuitry that may execute database operations on the disclosed directed property graph. The search query may include a data value (for example, 'Washington') that is to be searched in the directed property graph. In such a data search, a value vertex that has the value 'Washington' becomes an initial vertex for the search and all the edges associated with the initial vertex are tracked. The value vertex 'Washington' may be associated with multiple edge contexts in the directed property graph. Thus, the edges connected to the 'Washington' value vertex may have labels such as 'has person name', 'has house name', 'has street', 'has state', or the like. Additionally, the edges associated with the value vertex 'Washington' are also associated with diverse entity vertices (e.g., 'Employee Address', 'Employee Name', 'Employee Branch', or the like).

Each identified entity vertex may have other edges (apart from the one coupled to the value vertex 'Washington') that couple the corresponding entity vertex to other value vertices. The processing circuitry then identifies such additional edges and value vertices. For example, the value vertex 'Washington' may be associated with the entity vertex 'Employee Name' by way of an edge 'has last name' and the entity vertex 'Employee Address' by way of the edge 'has state'. Further, the entity vertex 'Employee Name' is associated with another value vertex 'Baker' by way of an edge 'has first name', whereas, the entity vertex 'Employee Address' is associated with value vertices 'Royal Enclave', 'Baker', 'United States of America', and '20005', by way of edges 'has house name', 'has street', 'has country', and 'has pin code', respectively. The processing circuitry tracks the aforementioned edges and obtains the data values stored at corresponding value vertices. In such a scenario, a response to the search query may include (i) First Name: Baker and Last Name: Washington, and (ii) House Name: Royal Enclave, Street: Baker, State: Washington, Country: United States of America, and Pin code: 20005. Additionally, the entity vertices 'Employee Name' and 'Employee Address' may be coupled to parent entity vertices 'Employee 1' and 'Employee 2', respectively, by way of corresponding contextualized edges. A contextualized edge may be indicative of an identifier (ID) associated with a parent entity vertex and a relationship between a child entity vertex and its parent entity vertex. The response may additionally include a label associated with the contextualized edge and entities represented by the parent entity vertices 'Employee 1' and 'Employee 2'. Thus, the response to the search query of 'Washington' may include (i) Employee 1 having the name as First Name: Baker and Last Name: Washington and (ii) Employee 2 having the address as House Name: Royal Enclave, Street: Baker, State: Washington, Country: United States of America, and Pin code: 20005. The present disclosure thus enables the execution of the data search.

The data values in the value vertices do not amount to being sensitive and confidential as there is no information context. However, the labels associated with the edges connecting the value vertices to the entity vertices provide context to the data values, and hence, result in the data of the directed property graph being sensitive and confidential. For example, the data value 'Washington' may not be sensitive when considered as a data unit. However, when considered in combination with the edge 'has address' associated with the entity vertex 'Address' and its parent entity vertex 'Employee 2', the data value 'Washington' becomes personal identification information (PII) data, and hence, is sensitive. Therefore, data values at value vertices, when considered with edges and entity vertices associated therewith, become PII or personal health information (PHI) data. The value vertices are thus required to be secured against any threats and attacks. As a result, the values vertices are encrypted by way of encryption techniques known in the art. In some cases, all value vertices are encrypted whereas in some cases selective and partial encryption is executed based on a confidential and sensitive context of the dataset represented by the directed property graph. Additionally, in some embodiments, different encryption strengths or encryption algorithms may be used to encrypt one or more value vertices.

Data and information searches in the directed property graph having encrypted value vertices may be executed in a different manner as compared to that described above. In such a scenario, a value index table and a vertex index table are additionally utilized. The value index table stores data values (e.g., all unique property values of the dataset) and a unique value ID for each data value. The value index table further stores a similarity code indicating similarity between two or more data values. For example, a first data value 'John' and a second data value 'Johnny' are significantly similar, and therefore, may have an identical similarity code. The vertex index table includes a mapping of the value IDs with corresponding vertex IDs that are unique to each value vertex. The use of the value and vertex index tables for retrieval of data from the directed property graph acts as an additional layer of security. Also, in order to access data from the dataset, each of the directed property graph, the value index table, and the vertex index table are required to be accessed. The value index table, the vertex index table, and the directed property graph may be stored in separate storage elements to enhance the security of the system.

In operation, when the search query is received, the processing circuitry may search the value index table to identify a data value associated with the search query. The processing circuitry may retrieve a value ID mapped to the identified data value and search the vertex index table based on the retrieved value ID to determine a vertex ID mapped to the retrieved value ID. Subsequently, the processing circuitry may search the directed property graph to identify a value vertex having the determined vertex ID. The processing circuitry may then decrypt a data value at the identified value vertex. Additionally, the processing circuitry may track one or more edges associated with the identified value vertex to further identify entity vertices coupled to the value vertex by way of the one or more edges. The processing circuitry may also determine a parent entity vertex linked to each entity vertex associated with the identified value vertex. Further, for each entity vertex, the processing circuitry may determine whether the entity vertex is associated with any additional edge. Subsequently, for each entity vertex, the processing circuitry may track each additional edge to identify a value vertex associated therewith. In case the data value at the identified value vertex is encrypted, the processing circuitry may decrypt the encrypted data value. In some embodiments, the processing circuitry may decrypt the encrypted data values as and when they are identified. In other embodiments, the processing circuitry may decrypt the encrypted data values during the generation of a response to the search query. Once decrypted data values are obtained, the processing circuitry may generate the response in a similar manner as described above. The present disclosure thus enables the execution of an encrypted data search using the directed property graph.

The present disclosure also facilitates the execution of wildcard data searches, similarity data searches, and composite data searches. In case of a wildcard data search, the search query may include an incomplete data value with one or more wildcards. An example of such a search query is 'Atlant %'. In such a scenario, the processing circuitry may identify two data values of 'Atlanta' and 'Atlantic' that are relevant to the search query and search for the identified two data values in a similar manner as described above. Further, the processing circuitry may execute a database operation (e.g., a union operation) on the search results to generate the response to the wildcard search query. In case of a similarity data search, the search query may include a complete data value (e.g., 'Atlanta') along with an indication that similar data values are also to be searched. In such a scenario, the processing circuitry may identify one or more data values (e.g., 'Atlantic) similar to the searched data value 'Atlanta'. For example, the processing circuitry may search the value index table to identify the data value of 'Atlanta', determine the similarity code associated with the data value of 'Atlanta', and search the value index table to identify one or more data values (e.g., 'Atlantic') with the same similarity code. Further, the processing circuitry may search for the identified two data values in a similar manner as described above and execute a database operation (e.g., a union operation) on the search results to generate the response to the similarity search query. In case of a composite data search, the search query may include two data values (e.g., 'Atlanta' and 'Georgia'). The two data values are individually searched in a similar manner as described above. However, once the edges and the entity vertices are identified, the processing circuitry may execute a database operation (e.g., an intersection operation) on the search results to generate the response to the composite search query.

The directed property graph of the present disclosure may further be utilized for executing information searches. In case of an information search, the search query may include the data value and a hint that defines the scope (e.g., the context) of the search. The search is executed in a manner that is similar to the abovementioned data search. However, once the edges and the entity vertices are identified, one or more relevant edges and one or more relevant vertices are determined using the hint. For example, if the search query includes 'Address Washington', edges having labels such as 'has last name', 'has first name', or the like, are filtered out, and exclusively the edges having labels 'has state', 'has street', or the like, and corresponding entity vertices are retained. Subsequently, for each retained entity vertex, one or more additional edges linked thereto are tracked to identify corresponding value vertices. In such a scenario, a response is generated based on the searched value vertex, retained (e.g., selected) edges and entity vertices associated with the searched value vertex, and additional edges and value vertices associated with each retained entity vertex.

Various combinations of the aforementioned searches (e.g., a wildcard information search, a similarity information search, a composite information search, or the like) may also be executed, without deviating from the scope of the present disclosure.

To summarise, the directed property graph of the present disclosure, stores data values at value vertices. During a data search, the required data value is searched in the value index table, the corresponding value vertex is identified using the vertex index table, and edges and entity vertices are tracked from the value vertices in the directed property graph to generate a response. Such an approach of searching requires only two tables and the relevant value vertices to be accessed to generate the response. This is contrary to the conventional RDBMS and conventional directed property graph where each column of each table or each property of each graph vertex is required to be accessed to execute the data search. As a result, the time taken to execute a data search in the directed property graph of the present disclosure is significantly less than that in the RDBMS and the conventional directed property graph. Further, while the value vertices in the directed property graph may be encrypted, the data values of the value index table and the vertex index table are not encrypted. This allows wildcard and similarity searches to be executed in the value index table in a time-efficient manner, whilst maintaining the security of the directed property graph. This is contrary to the RDBMS and the conventional directed property graph where either exclusively the database is encrypted which leads to an extremely vulnerable data security mechanism or each data value is encrypted which leads to a time-consuming search methodology. Therefore, the execution of the data search using the directed property graph of the present disclosure requires significantly less time and is more secure than the data searches executed using the RDBMS and the conventional directed property graph.

The present disclosure provides numerous advantages including an optimal organization and management of data. Additional advantages of such use of the directed property graph also include a significantly reduced cost (for example, time complexity and cost complexity) of data retrieval. Further, the execution of such searches does not have a prerequisite of knowledge of the underlying schema (i.e., ontology) of the directed property graph. Hence, the database operations may be executed with significant ease and reduced time consumption.

Figure Description

FIG. 1 is a block diagram that illustrates a system environment 100 for executing a search in a dataset, in accordance with an embodiment of the present disclosure. Referring to FIG. 1, the system environment 100 includes processing circuitry 102, a user device 104 associated with the processing circuitry 102, a first storage element 106, a second storage element 108, a third storage element 110, and a communication network 112. The first through third storage elements 106-110 are geographically distributed, and hence, correspond to decentralized data storages. The processing circuitry 102 is configured to access the first through third storage elements 106-110 via the communication network 112.

The processing circuitry 102 may include suitable logic, circuitry, interfaces, and/or code, executable by the circuitry, that may be configured to execute searches in the dataset. The processing circuitry 102 is configured to generate (e.g., derive) a directed property graph 114 based on the dataset. In an embodiment, the processing circuitry 102 is configured to receive an input for the creation of the directed property graph 114. The processing circuitry 102 may receive the input via the user device 104 or any other computing device associated therewith. In some embodiments, the input may be provided by the user using the user device 104 or any other computing device. In some embodiments, the input may be generated by the user device 104 or any other computing device. The input may be indicative of the dataset.

The dataset includes a plurality of entities, one or more properties associated with each entity, and one or more data values of the one or more properties, respectively. In an example, the dataset may be associated with a record of people (for example, Person 1, Person 2, Person 3, or the like) working within an organization, enrolled in an educational institution, or the like. In such a scenario, Person 1, Person 2, Person 3, or the like, correspond to the plurality of entities of the dataset. Further, each entity may include properties such as first name, middle name, last name, house name, street, city, country, pin code, marital status, gender, or the like. Each property may have a property value (e.g., a data value). Some properties may be related and may form a property group. For example, first name, middle name, and last name properties may form a property group 'Name'. Similarly, house name, street, city, country, and pin code properties may form a property group 'Address'. The property groups may be formed to simplify the retrieval of information from the dataset.

Generation of the Directed Property Graph 114:

To generate the directed property graph 114, the processing circuitry 102 executes various operations. For example, the processing circuitry 102 is configured to instantiate a value vertex for each unique data value of the dataset. The processing circuitry 102 is further configured to instantiate an entity vertex for each entity of the plurality of entities and each property group associated with each entity of the plurality of entities. The entity vertex instantiated for each entity is a parent of entity vertices instantiated for the property groups associated with the corresponding entity. Further, the processing circuitry 102 is configured to create one or more edges between each entity vertex and one or more value vertices having one or more data values associated with the corresponding entity vertex. The one or more edges are indicative of an association between the one or more properties and the corresponding entity vertex, respectively. Thus, each entity vertex corresponds to an entity of the dataset or a property group of an entity of the dataset, an associated edge corresponds to a property of the entity, and an associated value vertex corresponds to a data value of the property. The processing circuitry 102 is further configured to create one or more contextualized edges connecting the parent entity vertex that represents an entity of the dataset (for example, Person 1, Person 2, Person 3, or the like) to one or more child entity vertices that represent property groups associated with the corresponding entity, respectively.

The directed property graph 114 thus includes a plurality of value vertices, a plurality of entity vertices, and a plurality of edges with each edge linking (i.e., coupling) an entity vertex to a value vertex. In such a scenario, each edge includes a label that is indicative of a relationship between the entity vertex and the value vertex being linked. Further, one entity vertex (e.g., a parent entity vertex) is coupled to another entity vertex (e.g., a child entity vertex) by way of a contextualized edge. The contextualized edge includes an identifier (ID) of the parent entity vertex, in addition to a label that is indicative of the relationship between the parent entity vertex and the child entity vertex. Although not described, each edge and contextualized edge may include various other details regarding the two vertices that it couples.

In an example, an entity vertex may be 'Name', a value vertex may have a data value 'John', and the two vertices may be linked via an edge with a label 'has first name'. Further, another entity vertex 'Person 1' may be linked to the entity vertex 'Name' by way of a contextualized edge, and hence, is a parent to the entity vertex 'Name'. Therefore, the parent entity vertex 'Person 1' may be linked to a child entity vertex 'Name' that is linked to the value vertex 'John'. Consequently, it is indicated that the entity 'Person 1' has the first name 'John'.

Upon the generation of the directed property graph 114, the processing circuitry 102 is further configured to store the directed property graph 114 in the first storage element 106. The first storage element 106 thus includes suitable logic, circuitry, interfaces, and/or code, executable by the circuitry, that may be configured to store the directed property graph 114. Examples of the first storage element 106 may include, but are not limited to, a random-access memory (RAM), a read-only memory (ROM), a removable storage drive, a hard disk drive (HDD), a flash memory, a solid-state memory, or the like. It will be apparent to a person skilled in the art that the scope of the present disclosure is not limited to a standalone realization of the first storage element 106, as described herein. In another embodiment, the first storage element 106 is realized in the form of a database server or a cloud storage working in conjunction with the processing circuitry 102, without departing from the scope of the present disclosure.

The processing circuitry 102 may be further communicatively coupled to the user device 104 that may include suitable logic, circuitry, interfaces, and/or code, executable by the circuitry, that may be configured to execute one or more instructions. For example, the user device 104 may be configured to host and execute an application programming interface (API) that may be accessed by a user (not shown) of the user device 104 to initiate the search in the dataset. The user device 104 may be utilized to provide a user input that corresponds to a search query via the API hosted on the user device 104. The user input may be provided in the form of an audio input, a textual input, or the like. Examples of the user device 104 may include, but are not limited to, a desktop, a mobile phone, a tablet, a phablet, a laptop, or the like.

The processing circuitry 102 is thus configured to receive the search query, via the API executed on the user device 104, that pertains to the search to be executed on the dataset stored in the first storage element 106 in the form of the directed property graph 114. The search query includes a first reference value (e.g., a data value that is to be searched in the dataset). The search query may additionally include a hint associated with the first reference value. The hint provides contextual information associated with the first reference value. For example, a search query may include 'Washington' as the first reference value and a hint 'First Name' that may be indicative of a context of the first reference value 'Washington' being the first name.

Based on the received search query, the processing circuitry 102 may be configured to determine whether the search corresponds to a data search or an information search. The data search corresponds to a search executed on the dataset with respect to the first reference value such that each record associated with the first reference value is retrieved to generate a response to the search query, irrespective of the context thereof. On the other hand, the information search corresponds to a search executed on the dataset with respect to the first reference value such that the search is limited by the hint provided in the search query. A response to the information search conforms to the hint provided in the search query. Thus, the processing circuitry 102 may determine that the search is the data search based on the absence of the hint in the search query. Similarly, the processing circuitry 102 may determine that the search is the information search based on the presence of the hint in the search query.

Data Search:

When the search query corresponds to the data search, the processing circuitry 102 may execute the following operations. For example, the processing circuitry 102 is configured to communicate with the first storage element 106, via the communication network 112, to access the directed property graph 114. In the directed property graph 114, the processing circuitry 102 is configured to identify a first value vertex, from the plurality of value vertices, that represents a first data value associated with (e.g., that matches) the first reference value. The processing circuitry 102 is further configured to track a first set of edges, of the plurality of edges, that are associated with the first value vertex. The processing circuitry 102 is further configured to identify and track a first set of entity vertices, of the plurality of entity vertices, that are linked to the first value vertex by way of the tracked first set of edges. Further, the processing circuitry 102 is configured to generate a response to the search query based on the first data value, a first set of labels of the first set of edges, and a first set of entities of the dataset represented by the first set of entity vertices. In some embodiments, the first value vertex includes metadata that is a descriptor of the first data value, and the response for the search query is generated further based on the metadata of the first value vertex.

The processing circuitry 102 is further configured to track one or more additional edges that may be linked to each entity vertex of the first set of entity vertices. Further, the processing circuitry 102 is configured to identify, for each entity vertex, one or more value vertices coupled thereto by way of the one or more additional edges, respectively. In such a scenario, the response is generated further based on one or more labels associated with the one or more additional edges of each entity vertex of the first set of entity vertices and one or more data values associated with the identified one or more value vertices of each entity vertex of the first set of entity vertices, respectively. The processing circuitry 102 is further configured to render the response to the search query via a user interface of the API hosted on the user device 104.

A data search is thus executed using the directed property graph 114 of the present disclosure. The data search may be of various types, namely, a single-value data search, a composite data search, a wildcard data search, a similarity data search, or the like. A single-value data search refers to a search that is executed for the identification and retrieval of information associated with a single data value. In such a scenario, the search query includes a single data value (e.g., the first reference value). The aforementioned search is an example of a single-value data search.

A composite data search refers to a search that is executed for the identification and retrieval of information associated with two or more data values. In such a scenario, the search query includes at least two data values (e.g., the first reference value and a second reference value) and an indicator that is indicative of a database operation (e.g., a union operation, an intersection operation, or the like) to be performed for generating the response to the search query. A wildcard data search refers to a search that is executed for the identification and retrieval of information associated with a data value to be searched as well as other data values that are partly identical to the data value to be searched. In such a scenario, the search query includes the first reference value having a data string and a wildcard string. The wildcard string may include one or more wildcard characters. A similarity data search refers to a search that is executed for the identification and retrieval of information associated with a data value to be searched as well as other data values that are similar to the data value to be searched. One example of similar data values corresponds to data values that sound alike. Such searches are referred to as soundex searches. In such a scenario, the search query includes the first reference value and a similarity indicator to indicate that the search is to be executed for the first reference value and at least one data value that is similar to the first reference value. Notably, the information retrieved for the generation of the response during data searches is not limited by any context.

Thus, barring the single-value data search, the processing circuitry 102 is further configured to identify, based on the search query and in conjunction with the first value vertex, a second value vertex having a second data value. For the composite data search, the processing circuitry 102 is configured to search the directed property graph 114 to identify the second value vertex, of the plurality of value vertices, that represents the second data value associated with (e.g., that matches) the second reference value. For the wildcard data search, the processing circuitry 102 is configured to identify the second data value such that a first string of the first data value and a second string of the second data value match the data string of the first reference value, and search the directed property graph 114 to identify the second value vertex that represents the second data value. For the similarity data search, the processing circuitry 102 is configured to identify the second data value that is similar to the first data value (e.g., has an identical similarity (e.g., soundex) code to the first data value) and search the directed property graph 114 to identify the second value vertex that represents the second data value. The second value vertex is thus identified in a different manner based on the type of search.

The processing circuitry 102 is further configured to track a second set of edges coupled to the second value vertex and a second set of entity vertices coupled to the second value vertex by way of the second set of edges. The processing circuitry 102 generates the response further based on a second set of labels of the second set of edges and a second set of entities of the dataset represented by the second set of entity vertices. In such a scenario, the processing circuitry 102 is further configured to execute a database operation (e.g., an intersection operation, a union operation, or the like) on (i) the first set of labels and the first set of entities and (ii) the second set of labels and the second set of entities based on the type of the search. The response may thus correspond to an output of the database operation.

For the composite data search, if the search query indicates an 'AND' of the two data values, an intersection operation may be executed, and if the search query indicates an 'OR' of the two data values, a union operation may be executed. Similarly, for the wildcard and similarity data searches, a union operation may be executed. As a result of the database operation, a third set of edges coupling a third set of entity vertices to at least one of the first and second value vertices may be obtained. Further, the processing circuitry 102 may identify additional value vertices associated with each entity vertex of the third set of entity vertices in a similar manner as described above. Thus, the response is generated based on the first and second data values, a third set of labels associated with the third set of edges, a third set of entities represented by the third set of entity vertices, data values of additional value vertices associated with each entity vertex of the third set of entity vertices, and labels of edges coupling the additional value vertices to each entity vertex of the third set of entity vertices.

Each of the composite, wildcard, and similarity data searches is shown to result in the identification of two data values to keep the description concise and clear and should not be considered a limitation of the present disclosure. In various other embodiments, each of the composite, wildcard, and similarity searches may result in the identification of more than two data values, without deviating from the scope of the present disclosure. In such a scenario, the search may be executed for each data value individually in the similar manner as described above and a database operation may be executed on the search results to generate the response.

Information Search:

As mentioned earlier, the information search is executed when the search query includes the hint. The information search may be of various types, namely, a single-value information search, a composite information search, a wildcard information search, a similarity information search, or the like. The information search is the same as the data search except that the information to be included in the response is filtered based on the hint included in the search query. For example, for each of the composite, wildcard, and similarity information searches, the data search is executed in a similar manner as described above. Subsequently, the processing circuitry 102 is further configured to identify, from the first and second sets of edges, first and second subsets of edges that are associated with the hint, respectively. Further, the processing circuitry 102 is configured to identify, from the first and second sets of entity vertices, first and second subsets of entity vertices that are coupled to the first and second subsets of edges, respectively. The response is then generated based on first and second subsets of labels, of the first and second sets of labels, that are associated with the first and second subsets of edges, respectively, and first and second subsets of entities, of the first and second sets of entities, that are represented by the first and second subsets of entity vertices, respectively. For example, the processing circuitry 102 is further configured to execute a database operation on (i) the first subset of labels and the first subset of entities and (ii) the second subset of labels and the second subset of entities based on the type of the search.

The response may thus correspond to an output of the database operation. For example, as a result of the database operation, a fourth set of edges coupling a fourth set of entity vertices to at least one of the first and second value vertices may be obtained. Further, the processing circuitry 102 may identify additional value vertices associated with each entity vertex of the fourth set of entity vertices in a similar manner as described above. Thus, the response is generated based on the first and second data values, a fourth set of labels associated with the fourth set of edges, a fourth set of entities represented by the fourth set of entity vertices, data values of additional value vertices associated with each entity vertex of the fourth set of entity vertices, and labels of edges coupling the additional value vertices to each entity vertex of the fourth set of entity vertices.

The single-value information search is similarly executed with the processing circuitry 102 identifying, based on the hint, the first subset of edges and the first subset of entity vertices from the first set of edges and the first set of entity vertices, respectively.

Figure 2:
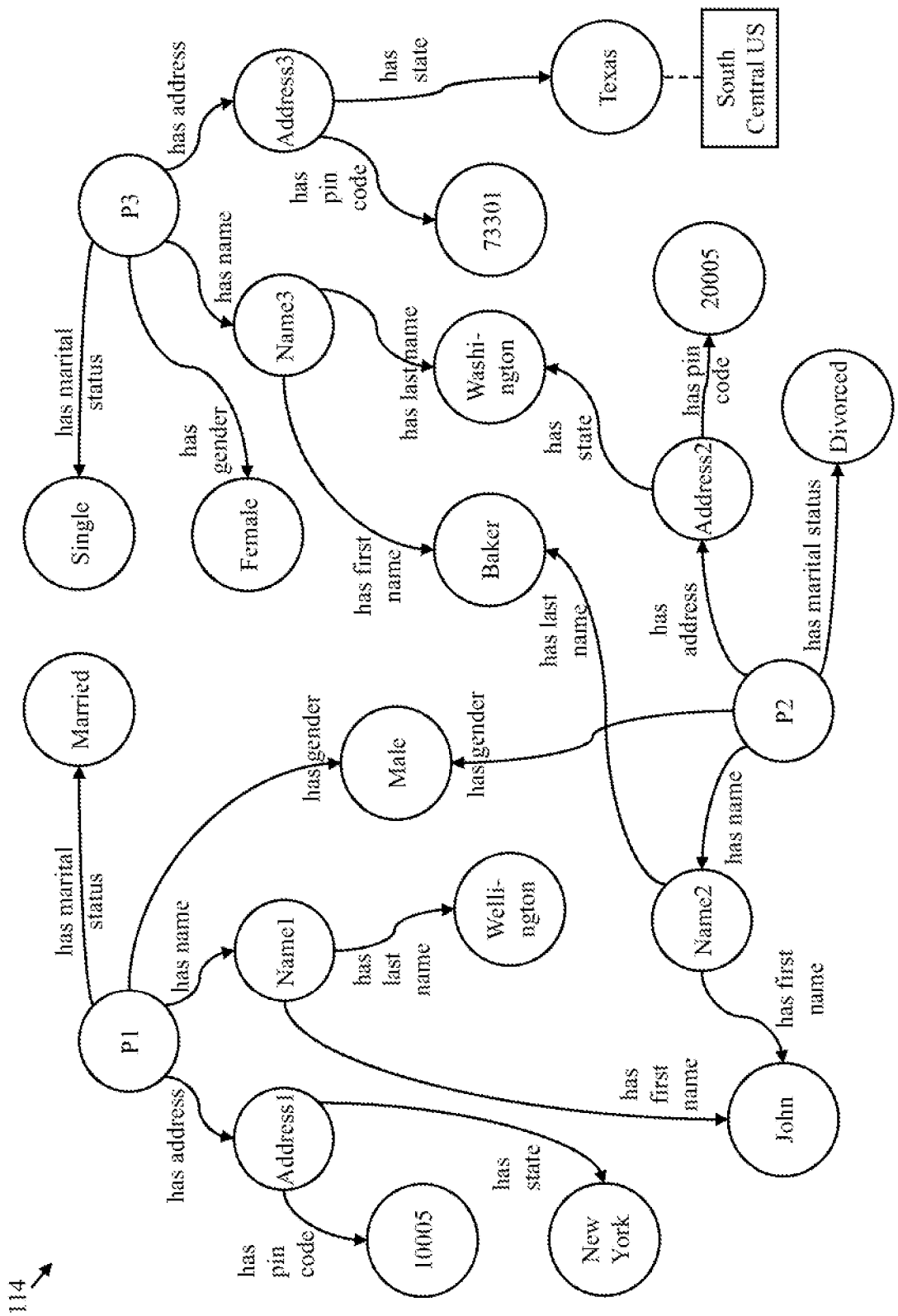
FIG. 2 is a diagram that illustrates a directed property graph, in accordance with an embodiment of the present disclosure.

Various types of data and information searches are described in detail in conjunction with FIG. 2.

Encrypted Value Vertices:

Data values stored at the plurality of value vertices do not amount to being sensitive and confidential as there is no information context. However, the labels associated with the plurality of edges connecting the plurality of value vertices to the plurality of entity vertices provide context to the data values, and hence, result in the data of the directed property graph 114 being sensitive and confidential. For example, a value vertex storing a bank account number when considered with an edge 'has bank account number' becomes highly sensitive and confidential. Therefore, data values at value vertices, when considered with edges and entity vertices associated therewith, become personal identification information (PII) data or personal health information (PHI) data. Hence, ensuring the security of data values stored at the value vertices is crucial. Thus, various value vertices of the directed property graph 114 may be encrypted by way of encryption techniques known in the art. In some cases, all value vertices are encrypted whereas in some cases selective and partial encryption is executed based on a confidential and sensitive context of the dataset represented by the directed property graph 114. Additionally, in some embodiments, different encryption strengths or encryption algorithms may be used to encrypt the value vertices. Data and information searches in such a directed property graph 114 are executed in a different manner as compared to those described above. The directed property graph 114 with encrypted value vertices is illustrated and explained in detail in conjunction with FIG. 3.

To facilitate searches in the directed property graph 114 with encrypted value vertices, the processing circuitry 102 is further configured to generate a value index table 116 and a vertex index table 118. The value index table 116 includes a mapping between each unique data value of the directed property graph 114 and a value ID assigned to the corresponding unique data value. In an embodiment, the value ID corresponds to a unique token value. In another embodiment, the value ID assigned to each unique data value is an encrypted version of the corresponding unique data value. Further, in the value index table 116, each unique data value of the directed property graph 114 and the associated value ID are mapped to a similarity code assigned thereto. An identical similarity code of two or more data values is indicative of similarity therebetween. The vertex index table 118 includes a mapping between the value ID assigned to each unique data value and a vertex ID of the corresponding value vertex. In the vertex index table 118, each vertex ID is further mapped to a decryption technique associated with the corresponding value vertex. The decryption technique is a process that converts encrypted data to its original form.

The processing circuitry 102 is further configured to store the value index table 116 and the vertex index table 118 in the second and third storage elements 108 and 110, respectively. The second and third storage elements 108 and 110 are similar to the first storage element 106. The value index table 116 and the vertex index table 118 are explained in detail in conjunction with FIGS. 4A and 4B.

Encrypted Data Search:

For a single-value data search, when the search query is received, the processing circuitry 102 identifies the first value vertex associated with the first reference value based on the value index table 116 and the vertex index table 118. For example, the processing circuitry 102 is configured to search the value index table 116 to identify the first data value that matches the first reference value, determine a first value ID mapped to the first data value, search the vertex index table 118 to identify the first value ID, determine a first vertex ID mapped to the first value ID, and search the directed property graph 114 to identify the first value vertex having the first vertex ID. Upon identification of the first value vertex, the processing circuitry 102 may conduct the search as described above.

Also, in order to generate the response, the value vertices to be included in the response are required to be decrypted. In the present example, the first value vertex and one or more value vertices (e.g., additional value vertices) coupled to each entity vertex associated with the first value vertex are in encrypted format. Thus, the processing circuitry 102 is configured to identify a first decryption technique mapped to the first vertex ID of the first value vertex in the vertex index table 118 and decrypt the first value vertex using the first decryption technique to obtain the first data value thereof. The decryption of the one or more value vertices may be executed in various ways.

In one embodiment, the processing circuitry 102 is further configured to search the vertex index table 118 to identify one or more vertex IDs of the one or more value vertices, respectively, determine one or more decryption techniques and one or more value IDs mapped to the one or more vertex IDs, respectively, and decrypt the one or more value vertices to obtain one or more data values thereof based on the one or more value IDs and the one or more decryption techniques, respectively. In such a scenario, the one or more value IDs may correspond to the encrypted versions of the corresponding data values and the decrypted one or more data values may be obtained by decrypting the one or more value IDs using corresponding decryption techniques.

In another embodiment, the processing circuitry 102 is configured to search the vertex index table 118 to identify the one or more vertex IDs of the one or more value vertices, respectively, determine the one or more value IDs mapped to the one or more vertex IDs, respectively, search the value index table 116 to identify the one or more value IDs, and determine the one or more data values mapped to the one or more value IDs, respectively.

A data search on the directed property graph 114 with encrypted value vertices is thus executed. The scope of the present disclosure is not limited to the execution of the data search in the afore-mentioned manner. In other embodiments, after the entity vertices are identified, the processing circuitry 102 may be configured to identify IDs of associated parent entity vertices and access the dataset (e.g., another database such as RDBMS, DocumentDB, or the like, that stores the dataset) to retrieve records associated with the identified IDs.

Execution of each of the composite, wildcard, and similarity searches is also different from that described above.

For the composite data search, the search query includes two data values (e.g., the first reference value and the second reference value) and an indicator that is indicative of a database operation to be performed for generating the response to the search query. In such a scenario, the second value vertex having the second data value corresponds to a value vertex that is associated with the second reference value. To identify the second value vertex, the processing circuitry 102 may execute various operations. For example, the processing circuitry 102 is further configured to search the value index table 116 to identify the first and second data values that match the first and second reference values, respectively. The processing circuitry 102 is further configured to determine the first value ID mapped to the first data value and a second value ID mapped to the second data value, search the vertex index table 118 to identify the first and second values ID, determine the first vertex ID mapped to the first value ID and a second vertex ID mapped to the second value ID, and search the directed property graph 114 to identify the first value vertex having the first vertex ID and the second value vertex having the second vertex ID.

For the wildcard data search, the search query includes the first reference value having the data string and the wildcard string, where the wildcard string includes the one or more wildcard characters. In such a scenario, the second value vertex having the second data value corresponds to a value vertex that is partly identical to the first value vertex (e.g., a portion of the first data value is identical to a portion of the second data value). To identify the second value vertex having the second data value, the processing circuitry 102 may execute various operations. For example, the processing circuitry 102 is further configured to search the value index table 116 to identify the first data value and the second data value of the second value vertex such that the first string of the first data value and the second string of the second data value match the data string of the first reference value. Further, the processing circuitry 102 is configured to determine the first and second value IDs mapped to the first and second data values, respectively, search the vertex index table 118 to identify the first and second value IDs, determine the first and second vertex IDs mapped to the first and second value IDs, respectively, and search the directed property graph 114 to identify the first value vertex having the first vertex ID and the second value vertex having the second vertex ID.

For the similarity data search, the search query includes the first reference value and the similarity indicator to indicate that the search is to be executed for the first reference value and at least one data value that is similar to the first reference value. In such a scenario, the second value vertex having the second data value corresponds to a value vertex that is similar (e.g., sound-based, text-based, or the like) to the first value vertex. To identify the second value vertex having the second data value, the processing circuitry 102 may execute various operations. For example, the processing circuitry 102 is further configured to search the value index table 116 to identify the first data value that matches the first reference value of the search query, determine a first similarity code mapped to the first data value, and detect, in the value index table 116, the second data value that has the first similarity code mapped thereto. The second value vertex is similar to the first value vertex such that the second value vertex has the second data value that is similar to the first data value. Further, the processing circuitry 102 is configured to determine the first and second value IDs mapped to the first and second data values, respectively, search the vertex index table 118 to identify the first and second value IDs, determine the first and second vertex IDs mapped to the first and second value IDs, respectively, and search the directed property graph 114 to identify the first value vertex having the first vertex ID and the second value vertex having the second vertex ID.

Once the first and second value vertices are identified, the processing circuitry 102 may execute the composite, wildcard, and similarity data searches in a similar manner as described above. In such a scenario, the second value vertex may be decrypted in a manner that is similar to the decryption of the first value vertex.

To execute the information search on the directed property graph 114 including encrypted value vertices, the processing circuitry 102 may identify one or more value vertices associated with the search query based on the value index table 116 and the vertex index table 118 in the similar manner as described above. Once the associated value vertices are identified in the directed property graph 114, the operations of the processing circuitry 102 remain the same as that explained above for the information search.

Figure 3:
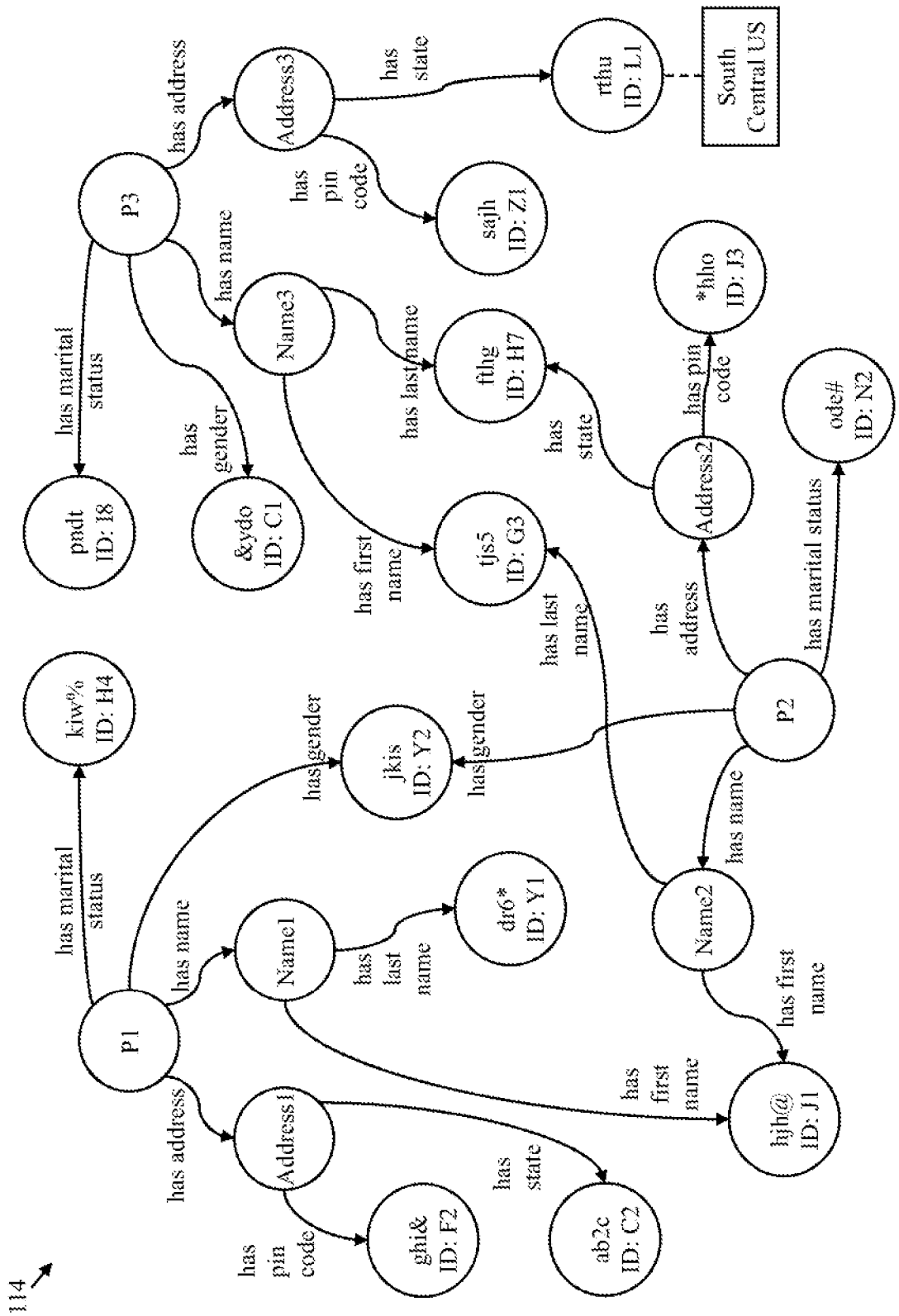
FIG. 3 is a diagram that illustrates the directed property graph, in accordance with another embodiment of the present disclosure.
Figures 4A, 4B:
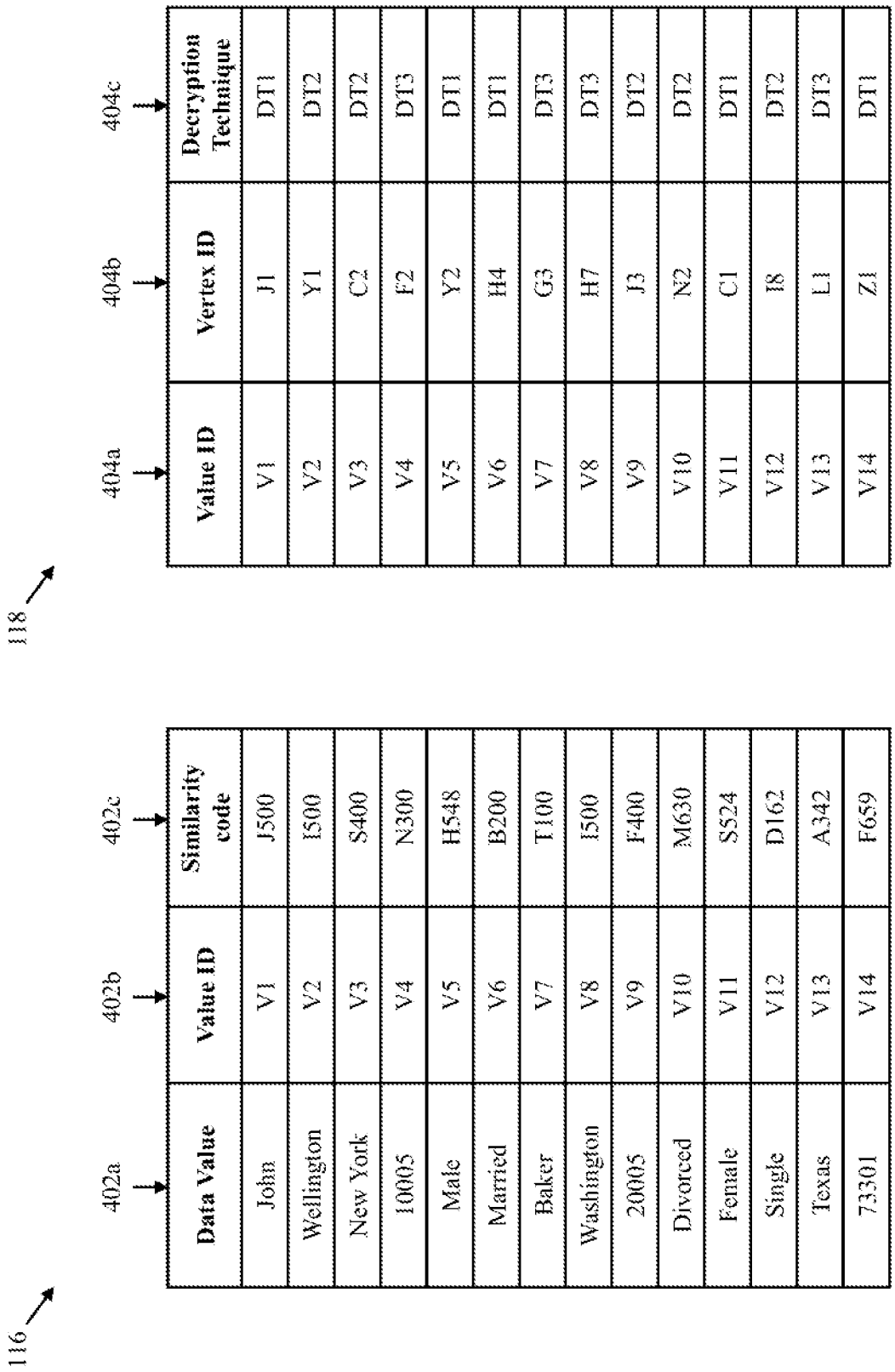
FIG. 4A is a diagram that illustrates a value index table, in accordance with an embodiment of the present disclosure.
FIG. 4B is a diagram that illustrates a vertex index table, in accordance with an embodiment of the present disclosure.

Various types of data and information searches on the directed property graph 114 with encrypted value vertices are described in detail in conjunction with FIGS. 3, 4A, and 4B.

The first through third storage elements 106-110 thus enable the execution of the search while ensuring the security of sensitive data stored in the directed property graph 114. Notably, each of the directed property graph 114, the value index table 116, and the vertex index table 118 is required to be accessed for executing the search on the directed property graph 114 with encrypted value vertices. Therefore, a distributed approach of storing the directed property graph 114, the value index table 116, and the vertex index table 118 in the decentralized first through third storage elements 106-110, respectively, ensures additional security to the dataset.

In some embodiments, the value index table 116 and the vertex index table 118 are encrypted. Thus, the processing circuitry 102 is further configured to decrypt the value index table 116 and the vertex index table 118 before searching the value index table 116 and the vertex index table 118.

The processing circuitry 102 may be implemented by one or more processors, such as, but not limited to, an application-specific integrated circuit (ASIC) processor, a reduced instruction set computer (RISC) processor, a complex instruction set computer (CISC) processor, and a field programmable gate array (FPGA) processor. The one or more processors may also correspond to central processing units (CPUs), graphics processing units (GPUs), neural processing units (NPUs), digital signal processors (DSPs), or the like. It will be apparent to a person of ordinary skill in the art that the processing circuitry 102 may be compatible with multiple operating systems. The processing circuitry 102 may further include one or more components (for example, a parser, a loader, or the like) that may be configured to execute one or more operations to be executed by the processing circuitry 102.

The communication network 112 is a medium through which instructions and data are transmitted between the processing circuitry 102 and each of the first through third storage elements 106-110. Examples of the communication network 112 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, microwave communication, and a combination thereof. Examples of the communication network 112 may further include a Narrow Band-Internet of Things (NB-IoT) network, a 5G network, a 4G network, a long-range (LoRa) wireless technology network, a ZigBee network, an Ipv6 Low-power Wireless Personal Area Network (6LowPAN), or the like. Various entities (such as the processing circuitry 102 and the first through third storage elements 106-110) in the system environment 100 may be coupled to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

It will be apparent to a person skilled in the art that FIG. 1 is exemplary and does not limit the scope of the present disclosure.

Although it is described that the dataset is associated with the record of people, the scope of the present disclosure is not limited to it. Searches may be executed in any other type of dataset using the methodology of the present disclosure.

FIG. 2 is a diagram that illustrates the directed property graph 114, in accordance with an embodiment of the present disclosure. Referring to FIG. 2, the directed property graph 114 is derived from the dataset associated with the record of people (for example, Person 1, Person 2, Person 3, or the like) working within an organization, enrolled in an educational institution, or the like.

The dataset includes first, second, and third records for Person 1, Person 2, and Person 3, respectively. Each record includes properties such as ID, first name, last name, state, pin code, gender, and marital status, and corresponding property values. Thus, the first record includes 'A1', 'John', 'Wellington', 'New York', '10005', 'Male', and 'Married' as data values of ID, first name, last name, state, pin code, gender, and marital status properties, respectively. Similarly, the second record includes 'A2', 'John', 'Baker', 'Washington', '20005', 'Male', and 'Divorced' as data values of ID, first name, last name, state, pin code, gender, and marital status properties, respectively. Further, the third record includes 'A3', 'Baker', 'Washington', 'Texas', '73301', 'Female', and 'Single' as data values of ID, first name, last name, state, pin code, gender, and marital status properties, respectively. Additionally, the third record includes metadata (e.g., 'South Central US') describing the state property of Person 3. For the sake of brevity, data values 'A1', 'A2', and 'A3' of property ID of the entities Person 1, Person 2, and Person 3, respectively, are not shown in FIGS. 2 and 3.

It will be apparent to a person skilled in the art that the dataset is shown to include three records and each record is shown to include five properties to keep the description concise and clear and should not be considered a limitation of the present disclosure. In various other embodiments, the dataset may include numerous records with each record including numerous properties, without deviating from the scope of the present disclosure.

To generate the directed property graph 114, each unique data value of the dataset is instantiated as value vertices. Thus, the directed property graph 114 includes value vertices 'John', 'Wellington', 'New York', '10005', 'Male', 'Married', 'Baker', 'Washington', '20005', 'Divorced', 'Texas', '73301', 'Female' and 'Single'. Further, the entities of the dataset are instantiated as entity vertices. Thus, the entities Person 1, Person 2, and Person 3 are instantiated as entity vertices 'P1', 'P2', and 'P3', respectively. Such entity vertices are referred to as parent entity vertices. Thus, the entity vertices correspond to the entities of the dataset and the value vertices correspond to the property values of various properties associated with each of the entities of the dataset. Some properties of the dataset may be related and may form a property group. For example, first name and last name properties may form a property group 'Name' and state and pin code properties may form a property group 'Address'. In such a scenario, a property group may be instantiated as a child entity vertex that is a link between a corresponding parent entity vertex and one or more value vertices. Thus, the directed property graph 114 includes child entity vertices corresponding to 'Name' and 'Address' property groups for each parent entity vertex 'P1', 'P2', and 'P3'. Additionally, edges are created to link the value vertices to parent entity vertices or child entity vertices. Each edge is akin to a property of the dataset and indicates a relationship between an entity vertex and a value vertex coupled thereto. Further, the child entity vertex is coupled to the parent entity vertex by way of the contextualized edge that describes the relationship therebetween and also includes the ID of the parent entity vertex. Each edge and contextualized edge may include metadata that defines a categorization or purpose thereof. For example, an edge coupling an 'Address' entity vertex to 'Washington' value vertex may have metadata 'Place'. Additionally, the metadata of an edge may have different descriptor levels to differentiate it from other edges. Further, the metadata of an edge may be applicable to the value and entity vertices it couples. The metadata of the edges and the value and entity vertices may be utilized for generating responses to the search queries. The directed property graph 114 thus includes the plurality of entity vertices derived from the entities and property groups of the dataset, the plurality of value vertices derived from the data values of the dataset, and the plurality of edges derived from the properties of the entities of the dataset.

The property groups may be formed to simplify the retrieval of information from the dataset. The directed property graph 114 of FIG. 2 is shown to include entity vertices instantiated for property groups. However, the scope of the present disclosure is not limited to it. In an alternate embodiment, each parent entity vertex may be directly coupled to all associated value vertices by way of edges describing associated properties. In an instance, each user of a plurality of users of the directed property graph 114 may have permission to access each property and corresponding property value associated with the entities of the dataset. In such an instance, each parent entity vertex may be directly coupled to all associated value vertices by way of edges describing associated properties. In another instance, when one or more users of the plurality of users may have different permission than other users of the plurality of users, the directed property graph 114 may include property groups to allow or restrict unauthorized access to specific data values.

Generation of the Directed Property Graph 114 from the Dataset:

As shown in FIG. 2, the directed property graph 114 includes the entity vertex 'P1' that stores the ID 'A1'. The entity vertex 'P1' is a parent to entity vertices 'Name1' and 'Address1' (e.g., property groups associated with the first record) and is coupled thereto by way of contextualized edges having labels 'has name' and 'has address', respectively. Although not shown, each contextualized edge may further include the ID 'A1' of the entity vertex 'P1' and other relevant information (e.g., metadata associated with corresponding entity P1). Further, the entity vertex 'Name1' is coupled to value vertices 'John' and 'Wellington' via edges 'has first name' and 'has last name', respectively. Similarly, the entity vertex 'Address1' is linked to value vertices 'New York' and '10005' via edges 'has state' and 'has pin code', respectively. The entity vertex 'P1' is directly coupled to value vertices 'Male' and 'Married' via edges 'has gender' and 'has marital status', respectively. The first record is thus created in the directed property graph 114 (e.g., is converted into a portion of the directed property graph 114).

Similarly, the directed property graph 114 includes the entity vertex 'P2' that stores the ID 'A2'. The entity vertex 'P2' is a parent to entity vertices 'Name2' and 'Address2' in a similar manner as described above for the first record. Further, the entity vertex 'Name2' is coupled to value vertices 'John' and 'Baker' via edges 'has first name' and 'has last name', respectively, and the entity vertex 'Address2' is linked to value vertices 'Washington' and '20005' via edges 'has state' and 'has pin code', respectively. Here, the 'John' vertex is shared by two entity vertices (e.g., the entity vertices 'P1' and 'P2'). Further, the entity vertex 'P2' is directly coupled to value vertices 'Male' and 'Divorced' via edges 'has gender' and 'has marital status', respectively. The second record is thus created in the directed property graph 114.

The directed property graph 114 further includes the entity vertex 'P3' that stores the ID 'A3'. The entity vertex 'P3' is a parent to entity vertices 'Name3'and' Address3' in a similar manner as described above for the first record. Further, the entity vertex 'Name3' is coupled to value vertices 'Baker' and 'Washington' via edges 'has first name' and 'has last name', respectively, and the entity vertex 'Address3' is linked to value vertices 'Texas' and '73301' via edges 'has state' and 'has pin code', respectively. The value vertex 'Texas' is further associated with metadata 'South Central US'. The metadata provides information about the data value stored at the corresponding value vertex. For example, the metadata 'South Central US' provides information that the state 'Texas' is located in the south-central part of the United States. Further, the entity vertex 'P3' is directly coupled to value vertices 'Female' and 'Single' via edges 'has gender' and 'has marital status', respectively. The third record is thus created in the directed property graph 114.

Single-Value Data Search:

During the single-value data search, the processing circuitry 102 may receive the search query that includes the first reference value (e.g., 'Washington'). The processing circuitry 102 may parse the search query and may determine that the search query includes the reference value 'Washington' and does not include any hint associated therewith. Therefore, the processing circuitry 102 may initiate the single-value data search on the directed property graph 114 and identify the value vertex 'Washington'. The value vertex 'Washington' thus becomes the initial vertex for the search. The processing circuitry 102 then tracks the edges 'has last name' and 'has state' that are coupled to the value vertex 'Washington'. The processing circuitry 102 further tracks the entity vertex 'Name3' and the entity vertex 'Address2' that are coupled to the value vertex 'Washington' by way of the edges 'has last name' and 'has state', respectively. Further, the processing circuitry 102 identifies that the entity vertex 'Name3' is also coupled to the value vertex 'Baker' by way of the edge 'has first name' and that the entity vertex 'Address2' is also coupled to the value vertex '20005' by way of the edge 'has pin code'. In such a scenario, the response to the search query may correspond to (i) First Name: Baker and Last Name: Washington and (ii) State: Washington and Pin code: 20005. Additionally, the processing circuitry 102 may identify parent entity vertices (e.g., the entity vertices 'P3' and 'P2') associated with the entity vertices 'Name3' and 'Address2' by way of corresponding contextualized edges. The response may thus correspond to (i) Person 3 having the name as First Name: Baker and the Last Name: Washington and (ii) Person 2 having the address as State: Washington and Pin code: 20005. The single-value data search is thus executed in the present disclosure.

Single-Value Information Search:

When the search query further includes a hint 'Last Name' along with the reference value 'Washington', the search corresponds to an information search. In such a scenario, the data value search for 'Washington' is executed in a similar manner as described above to identify the entity vertex 'Name3' coupled to the value vertex 'Washington' by way of the edge 'has last name' and the entity vertex 'Address2' coupled to the value vertex 'Washington' by way of the edge 'has state'. Further, as the hint corresponds to 'Last Name', the processing circuitry 102 selects the edge 'has last name' and the corresponding entity vertex for generating the response. In other words, the edge 'has state' and the corresponding entity vertex are filtered out. Further, the processing circuitry 102 may identify that the entity vertex 'Name3' is also coupled to the value vertex 'Baker' by way of the edge 'has first name'. In such a scenario, the response to the search query may correspond to First Name: Baker and Last Name: Washington or Person 3 having the name as First Name: Baker and the Last Name: Washington. The single-value information search is thus executed in the present disclosure.

Although it is described that the hint is associated with the properties of the entities, the scope of the present disclosure is not limited to it. In other embodiments, the hint may be, alternatively or additionally, associated with the entities of the dataset, without deviating from the scope of the present disclosure.

The scope of the present disclosure is not limited to executing single-value searches. Various other types of data searches, e.g., composite searches, wildcard searches, similarity searches, or the like, are executed in the present disclosure, without deviating from the scope of the present disclosure.

Composite Data Search:

In case of the composite data search, the search query may include the second reference value in addition to the first reference value and may indicate the relation between the two data values. For example, the search query may correspond to 'Washington and Baker'. In such a scenario, the processing circuitry 102 may identify edges 'has state' and 'has last name' and corresponding entity vertices for the value vertex 'Washington' in a similar manner as described above. Further, the processing circuitry 102 may identify the value vertex 'Baker' in the directed property graph 114 that is associated with the second reference value. The processing circuitry 102 may then track the edges 'has last name' and 'has first name' coupled to the value vertex 'Baker'. The processing circuitry 102 may further track the entity vertex 'Name2' that is coupled to the value vertex 'Baker' by way of the edge 'has last name' and the entity vertex 'Name3' that is coupled to the value vertex 'Baker' by way of the edge 'has first name'. As the composite search query includes 'and' between the two data values, hence, edges and entity vertices that are associated with each of the data values 'Washington' and 'Baker' are to be included in the response. Therefore, an intersection operation is executed on the edges and entity vertices identified for value vertices 'Baker' and 'Washington'. The result of the intersection operation is the entity vertex 'Name3' coupled to the value vertices 'Baker' and 'Washington' by way of the edges 'has first name' and 'has last name'. As the entity vertex 'Name3' does not have any other edges, the response to the search query may correspond to First Name: Baker and Last Name: Washington or Person 3 having the name as First Name: Baker and the Last Name: Washington. The composite data search is thus executed in the present disclosure.

Composite Information Search:

When the composite search query further includes a hint associated with at least one of the first and second reference values, the search corresponds to a composite information search. In such a scenario, after identifying the edges and entity vertices for each value vertex, the processing circuitry 102 may execute the selection (e.g., filtering) operation to select edges and entity vertices that are relevant to the hint included in the search query. The database operation (e.g., the intersection operation in the above example) may be executed on the filtered edges and entity vertices. For example, the search query may correspond to 'Washington and First Name: Baker'. In such a scenario, after identifying all the edges and entity vertices coupled to the value vertex 'Baker', only the edge 'has first name' is retained. The intersection operation is then executed on the edges and entity vertices retained for value vertex 'Baker' and all the edges and entity vertices identified for value vertex 'Washington'.

Wildcard Data Search:

In case of the wildcard data search, the search query may correspond to '% #$*ington'. In such an example, the processing circuitry 102 may determine a data string 'ington' and a wildcard string '% #$*'. Subsequently, the processing circuitry 102 may identify data values 'Wellington' and 'Washington' that are associated with the first reference value '% #$*ington' such that the data values 'Wellington' and 'Washington' include the data string 'ington'. Although not shown, the processing circuitry 102 may generate a data value table (e.g., similar to the value index table 116) including all the unique data values of the dataset, and store the data value table in a fourth storage element (not shown). Further, processing circuitry 102 may search the data value table to identify data values 'Wellington' and 'Washington' that are associated with the first reference value '% #$*ington'.

The processing circuitry 102 may identify edges 'has state' and 'has last name' and corresponding entity vertices for the value vertex 'Washington' in a similar manner as described above. Additionally, the processing circuitry 102 may identify the value vertex 'Wellington' in the directed property graph 114 and track the edge 'has last name' that couples the value vertex 'Wellington' to the entity vertex 'Name1'. A union operation is then executed on the edges and entity vertices identified for value vertices 'Wellington' and 'Washington'. The result of the union operation is the entity vertex 'Name3' coupled to the value vertex 'Washington' by way of the edge 'has last name', the entity vertex 'Address2' coupled to the value vertex 'Washington' by way of the edge 'has state', and the entity vertex 'Name1' coupled to the value vertex 'Wellington' by way of the edge 'has last name'. Further, the processing circuitry 102 identifies that the entity vertex 'Name3' is also coupled to the value vertex 'Baker' by way of the edge 'has first name', that the entity vertex 'Address2' is also coupled to the value vertex '20005' by way of the edge 'has pin code', and that entity vertex 'Name1' is also coupled to the value vertex 'John' by way of the edge 'has first name'. In such a scenario, the response to the search query may correspond to (i) First Name: Baker and Last Name: Washington, (ii) State: Washington and Pin code: 20005, and (iii) First Name: John and Last Name: Wellington. Additionally, the processing circuitry 102 may identify parent entity vertices (e.g., the entity vertices 'P3', 'P2', and 'P1') associated with the entity vertices 'Name3', 'Address2', and 'Name1' by way of corresponding contextualized edges. The response may thus correspond to (i) Person 3 having the name as First Name: Baker and the Last Name: Washington, (ii) Person 2 having the address as State: Washington and Pin code: 20005, and (iii) Person 1 having the name as First Name: John and Last Name: Wellington. The wildcard data search is thus executed in the present disclosure.

Wildcard Information Search:

When the wildcard search query further includes the hint, the search corresponds to a wildcard information search. In such a scenario, after identifying the edges and entity vertices for each value vertex, the processing circuitry 102 may execute the selection (e.g., filtering) operation to select edges and entity vertices that are relevant to the hint included in the search query. The database operation (e.g., the union operation in the above example) may be executed on the filtered edges and entity vertices. For example, the search query may correspond to 'Last Name: % #$*ington'. In such a scenario, after identifying all the edges and entity vertices coupled to the value vertices 'Washington' and 'Wellington', only the edges 'has last name' are retained. Thus, the response to the search query may correspond to (i) First Name: Baker and Last Name: Washington and First Name: John and Last Name: Wellington or (ii) Person 3 having the name as First Name: Baker and the Last Name: Washington and Person 1 having the name as First Name: John and Last Name: Wellington. The wildcard information search is thus executed in the present disclosure.

Similarity Data Search:

In case of the similarity data search, the search query may correspond to 'Washington' and the similarity indicator. The similarity indicator may be indicative of similar spelling or pronunciation. In such an example, the processing circuitry 102 may identify the data value 'Wellington' that is similar to the data value 'Washington'. Although not shown, the processing circuitry 102 may generate the data value table (e.g., similar to the value index table 116) including all the unique data values of the dataset and a similarity code for each data value, and store the data value table in the fourth storage element. Further, processing circuitry 102 may search the data value table to identify data value 'Washington', determine the similarity code mapped to 'Washington', and search the data value table to identify other data values (e.g., 'Wellington') that have the same similarity code. In the present example, the data values 'Wellington' and 'Washington' may have the same similarity code as they sound alike, their spellings have significant overlap, or the like.

The processing circuitry 102 may identify the edges 'has state' and 'has last name' and the corresponding entity vertices for the value vertex 'Washington' and the edge 'has last name' and the corresponding entity vertex for the value vertex 'Wellington' in the similar manner as described above. A union operation is then executed on the edges and entity vertices identified for value vertices 'Wellington' and 'Washington'. The response to the search query may thus correspond to (i) First Name: Baker and Last Name: Washington, (ii) State: Washington and Pin code: 20005, and (iii) First Name: John and Last Name: Wellington. Additionally, the processing circuitry 102 may identify parent entity vertices (e.g., the entity vertices 'P3', 'P2', and 'P1') associated with the entity vertices 'Name3', 'Address2', and 'Name1' by way of corresponding contextualized edges. The response may thus correspond to (i) Person 3 having the name as First Name: Baker and the Last Name: Washington, (ii) Person 2 having the address as State: Washington and Pin code: 20005, and (iii) Person 1 having the name as First Name: John and Last Name: Wellington. The similarity data search is thus executed in the present disclosure.

Similarity Information Search:

When the similarity search query further includes the hint, the search corresponds to a similarity information search. In such a scenario, after identifying the edges and entity vertices for each value vertex, the processing circuitry 102 may execute the selection (e.g., filtering) operation to select edges and entity vertices that are relevant to the hint included in the search query. The database operation (e.g., the union operation in the above example) may be executed on the filtered edges and entity vertices. For example, the search query may correspond to 'Last Name: Washington' and the similarity indicator. In such a scenario, the processing circuitry 102 may identify the data value 'Wellington' that is similar to the data value 'Washington' and track all the edges and entity vertices coupled to the value vertices 'Washington' and 'Wellington'. Subsequently, only the edges 'has last name' are retained. Thus, the response to the search query may correspond to (i) First Name: Baker and Last Name: Washington and First Name: John and Last Name: Wellington or (ii) Person 3 having the name as First Name: Baker and the Last Name: Washington and Person 1 having the name as First Name: John and Last Name: Wellington. The similarity information search is thus executed in the present disclosure.

The scope of the present disclosure is not limited to the types of searches described above. Various other types of searches (such as combinations of the types described above) may be executed using the methodology of the present disclosure.

For the sake of brevity, the directed property graph 114 is shown to include three hierarchical levels. In other embodiments, the directed property graph 114 may include as many hierarchical levels as may be required for the execution of efficient and optimized searches on the dataset.

FIG. 3 is a diagram that illustrates the directed property graph 114, in accordance with another embodiment of the present disclosure. Referring to FIG. 3, the directed property graph 114 is derived from the dataset associated with the record of people (for example, Person 1, Person 2, Person 3, or the like) working within an organization, enrolled in an educational institution, or the like. The directed property graph 114 of FIG. 3 has the same structure as the directed property graph 114 of FIG. 2. The difference between the directed property graph 114 of FIGS. 2 and 3 is that the directed property graph 114 of FIG. 2 includes value vertices that are not encrypted (e.g., store actual data values), whereas, the directed property graph 114 of FIG. 3 includes encrypted value vertices (e.g., value vertices store encrypted data values).

The directed property graph 114 of FIG. 3 is generated in a similar manner as that described in FIG. 2, except that while instantiating value vertices, the processing circuitry 102 is further configured to generate an encrypted value for each data value and store the encrypted value in the value vertices instead of the actual data value. Thus, as shown in FIG. 3, the directed property graph 114 includes encrypted value vertices 'hjh@', 'dr6*', 'ab2c', 'ghi&', 'jkis', 'kiw %', 'tjs5', 'fthg', '*hho', 'ode #', 'rthu', 'sajh', '&ydo', and 'pndt' instead of 'John', 'Wellington', 'New York', '10005', 'Male', 'Married', 'Baker', 'Washington', '20005', 'Divorced', 'Texas', '73301', 'Female' and 'Single', respectively. Further, each encrypted value vertex may have a unique vertex ID. Thus, as shown in FIG. 3, the encrypted value vertices 'hjh@', 'dr6*', 'ab2c', 'ghi&', 'jkis', 'kiw %', 'tjs5', 'fthg', '*hho', 'ode #', 'rthu', 'sajh', '&ydo', and 'pndt' have vertex IDs 'J1', 'Y1', 'C2', 'F2', 'Y2', 'H4', 'G3', 'H7', 'J3', 'N2', 'L1', 'Z1', 'C1' and 'I8', respectively.

Although it is shown that all the value vertices are encrypted, the scope of the present disclosure is not limited to it. In other embodiments, one or more value vertices may not be encrypted, without deviating from the scope of the present disclosure. In such a scenario, the value index table 116 and the vertex index table 118 may include the details associated with such non-encrypted data values as none, not applicable, or the like.

The processing circuitry 102 may utilize different encryption techniques for encrypting the data values. For the ongoing discussion, it is assumed that data values 'John', 'Male', 'Married', '73301', and 'Female' are encrypted using a first encryption technique. Thus, the encrypted value vertices 'hjh@', 'jkis', 'kiw %', 'sajh', and '&ydo' can be decrypted using a first decryption technique, that is associated with the first encrypted technique, to obtain the data values 'John', 'Male', 'Married', '73301' and 'Female', respectively. Similarly, data values 'Wellington', 'New York', '20005', 'Divorced', and 'Single' are encrypted using a second encryption technique, and the encrypted value vertices 'dr6*', 'ab2c', '*hho', 'ode #', and 'pndt' can be decrypted using a second decryption technique, that is associated with the second encrypted technique, to obtain the data values 'Wellington', 'New York', '20005', 'Divorced', and 'Single', respectively. Further, data values '10005', 'Baker', 'Washington', and 'Texas' are encrypted using a third encryption technique, and the encrypted value vertices 'ghi&', 'tjs5', 'fthg', and 'rthu' can be decrypted using a third decryption technique, that is associated with the third encrypted technique, to obtain the data values '10005', 'Baker', 'Washington', and 'Texas', respectively.

To enable data and information searches in the directed property graph 114 of FIG. 3, the processing circuitry 102 may additionally generate the value index table 116 and the vertex index table 118. The value index table 116 is illustrated in FIG. 4A and the vertex index table 118 is illustrated in FIG. 4B.

FIG. 4A is a diagram that illustrates the value index table 116, in accordance with an embodiment of the present disclosure. The value index table 116 may include the mapping between each unique data value of the dataset, the value ID assigned to the corresponding unique data value, and the similarity code assigned to the corresponding unique data value. As shown in FIG. 4A, the value index table 116 includes first through third columns 402a-402c corresponding to the data values, the value IDs, and the similarity codes, respectively.

As illustrated by a first row of the value index table 116, the data value 'John' is assigned the value ID 'V1' and the similarity code 'J500'. Similarly, as illustrated by a second row of the value index table 116, the data value 'Wellington' is assigned the value ID 'V2' and the similarity code 'I500'. Further, as illustrated by third through fourteenth rows of the value index table 116, the data values 'New York', '10005', 'Male', 'Married', 'Baker', 'Washington', '20005', 'Divorced', 'Female', 'Single', 'Texas', and '73301' are assigned the value IDs 'V3', 'V4', 'V5', 'V6', 'V7', 'V8', 'V9', 'V10', 'V11', 'V12', 'V13', and 'V14', and the similarity codes 'S400', 'N300', 'H548', 'B200', 'T100', 'I500', 'F400', 'M630', 'S524', 'D162', 'A342', and 'F659', respectively. Thus, the data values 'Wellington' and 'Washington' have identical similarity codes.

FIG. 4B is a diagram that illustrates the vertex index table 118, in accordance with an embodiment of the present disclosure. The vertex index table 118 may include the mapping between the value ID assigned to each unique data value, the vertex ID of the encrypted value vertex associated with the corresponding data value, and the decryption technique utilized for decrypting the corresponding encrypted value vertex. As shown in FIG. 4B, the vertex index table 118 includes fourth through sixth columns 404a-404c corresponding to the value IDs, the vertex IDs, and the decryption techniques, respectively.

As illustrated by a first row of the vertex index table 118, the value ID 'V1' is associated with the encrypted value vertex having vertex ID 'J1' and the encrypted value vertex can be decrypted using the decryption technique 'DT1'. Similarly, as illustrated by a second row of the vertex index table 118, the value ID 'V2' is associated with the encrypted value vertex having vertex ID 'Y1' and the encrypted value vertex can be decrypted using the decryption technique 'DT2'. Further, as illustrated by third through fourteenth rows of the vertex index table 118, the value IDs 'V3', 'V4', 'V5', 'V6', 'V7', 'V8', 'V9', 'V10', 'V11', 'V12', 'V13', and 'V14', are associated with the encrypted value vertices having vertex IDs 'C2', 'F2', 'Y2', 'H4', 'G3', 'H7', 'J3', 'N2', 'C1', 'I8', 'L1', and 'Z1', and the encrypted value vertices can be decrypted using the decryption techniques 'DT2', 'DT3', 'DT1', 'DT1', 'DT3', 'DT3', 'DT2', 'DT2', 'DT1', 'DT2', 'DT3', and 'DT1', respectively. The decryption techniques 'DT1', 'DT2', and 'DT3' correspond to the first through third decryption techniques described in FIG. 3, respectively.

The value index table 116 and the vertex index table 118 are utilized for executing various data and information searches.

Single-Value Encrypted Data Search:

During the single-value data search, the processing circuitry 102 may receive the search query that includes the first reference value (e.g., 'Washington'). The processing circuitry 102 may parse the search query and may determine that the search query includes the reference value 'Washington' and does not include any hint associated therewith. Therefore, the processing circuitry 102 may initiate the single-value data search on the directed property graph 114 of FIG. 3. In such a scenario, the processing circuitry 102 may search the value index table 116 to identify the data value 'Washington' and determine the value ID 'V8' that is mapped to the data value 'Washington'. Subsequently, the processing circuitry 102 may search the vertex index table 118 to identify the value ID 'V8' and determine the vertex ID 'H7' that is mapped to the value ID 'V8'. The processing circuitry 102 may then search the directed property graph 114 of FIG. 3 to identify the value vertex 'fthg' having the vertex ID 'H7'. The value vertex with vertex ID 'H7' represents an encrypted form of the data value associated with the first reference value.

The value vertex 'fthg' thus becomes the initial vertex for the search. The processing circuitry 102 then tracks the edges 'has last name' and 'has state' that are coupled to the value vertex 'fthg'. The processing circuitry 102 further tracks the entity vertex 'Name3' and the entity vertex 'Address2' that are coupled to the value vertex 'fthg' by way of the edges 'has last name' and 'has state', respectively. Further, the processing circuitry 102 identifies that the entity vertex 'Name3' is also coupled to the value vertex 'tjs5' having the vertex ID 'G3' by way of the edge 'has first name' and that the entity vertex 'Address2' is also coupled to the value vertex '*hho' having the vertex ID 'J3' by way of the edge 'has pin code'. The value vertices with vertex IDs 'G3' and 'J3' also represent encrypted data values associated with the search. In such a scenario, in order to generate the response, the value vertices to be included in the response are required to be decrypted.

To decrypt the value vertex 'fthg', the processing circuitry 102 may search the vertex index table 118 to identify the vertex ID 'H7' and determine the decryption technique 'DT3' mapped to the vertex ID 'H7'. The processing circuitry 102 may decrypt the value vertex 'fthg' using the third decryption technique to obtain the data value 'Washington'. Further, to decrypt the value vertices 'tjs5' and '*hho', the processing circuitry 102 may search the vertex index table 118 to identify the vertex IDs 'G3' and 'J3' of the value vertices 'tjs5' and '*hho', respectively, determine the value IDs 'V7' and 'V9' mapped to the vertex IDs 'G3' and 'J3', respectively, search the value index table 116 to identify the value IDs 'V7' and 'V9', and determine the data values 'Baker' and '20005' mapped to the value IDs 'V7' and 'V9', respectively. Once the actual data values are obtained, the processing circuitry 102 may generate the response in a manner similar to the single-value data search described in FIG. 2.

The value IDs included in the value index table 116 and the vertex index table 118 correspond to token values. However, the scope of the present disclosure is not limited to it. In other embodiments, the encrypted data values are utilized as the value IDs, without deviating from the scope of the present disclosure. In such a scenario, the value ID 'V1' may be replaced with 'hjh@'. Other value IDs may be similarly replaced with corresponding encrypted data values. Thus, in such value and vertex index tables 116 and 118, to decrypt the value vertices 'tjs5' and '*hho', the processing circuitry 102 may search the vertex index table 118 to identify the vertex IDs 'G3' and 'J3' of the value vertices 'tjs5' and '*hho', respectively, determine the decryption techniques 'DT3' and 'DT2' and value IDs 'tjs5' and '*hho' mapped to the vertex IDs 'G3' and 'J3', respectively, and decrypt the value vertices 'tjs5' and '*hho' using the decryption techniques 'DT3' and 'DT2' to obtain the data values 'Baker' and '20005', respectively.

Single-Value Encrypted Information Search:

When the search query further includes a hint 'Last Name' along with the reference value 'Washington', the search corresponds to the information search. In such a scenario, the data search is executed in a similar manner to obtain the value vertex 'fthg', and the entity vertices 'Name3' and 'Address2' that are coupled to the value vertex 'fthg' by way of the edges 'has last name' and 'has state', respectively. Further, as the hint corresponds to 'Last Name', the processing circuitry 102 selects the edge 'has last name' and the corresponding entity vertex for generating the response. Further, the processing circuitry 102 identifies that the entity vertex 'Name3' is also coupled to the value vertex 'tjs5' having the vertex ID 'G3' by way of the edge 'has first name'. Further, the value vertices 'fthg' and 'tjs5' with vertex IDs 'H7' and 'G3' are decrypted in a similar manner as described above to obtain the data values 'Washington' and 'Baker'.

Composite Encrypted Data Search:

In case of the composite data search, the search query may include the second reference value in addition to the first reference value and may indicate the relation between the two data values. For example, the search query may correspond to 'Washington and Baker'. In such a scenario, the processing circuitry 102 may search the value index table 116 to identify the data values 'Washington' and 'Baker' and determine the value IDs 'V8' and 'V7' mapped thereto, respectively. Further, the processing circuitry 102 may search the vertex index table 118 to identify the value IDs 'V8' and 'V7' and determine the vertex IDs 'H7' and 'G3' mapped thereto, respectively. Further, the processing circuitry 102 may search the directed property graph 114 to identify the value vertices 'fthg' and 'tjs5' having the vertex IDs 'H7'and'G3', respectively.

The processing circuitry 102 may then identify edges 'has state' and 'has last name' and corresponding entity vertices for the value vertex 'fthg' in a similar manner as described above. Further, the processing circuitry 102 may identify the value vertex 'tjs5' in the directed property graph 114 of FIG. 3. The processing circuitry 102 may then track the edges 'has last name' and 'has first name' coupled to the value vertex 'tjs5'. The processing circuitry 102 may further track the entity vertex 'Name2' that is coupled to the value vertex 'tjs5' by way of the edge 'has last name' and the entity vertex 'Name3' that is coupled to the value vertex 'tjs5' by way of the edge 'has first name'. As the composite search query includes 'and' between the two data values, an intersection operation is executed on the edges and entity vertices identified for value vertices 'tjs5' and 'fthg'. The result of the intersection operation is the entity vertex 'Name3' coupled to the value vertices 'tjs5' and 'fthg' by way of the edges 'has first name' and 'has last name'. The value vertices 'tjs5' and 'fthg' may then be decrypted in a similar manner as described above to obtain the data values 'Baker' and 'Washington', respectively. Once the data values are obtained, the processing circuitry 102 may generate the response in a manner similar to the composite data search described in FIG. 2.

Composite Encrypted Information Search:

When the composite search query further includes the hint associated with at least one of the first and second reference values, the search corresponds to the composite information search. In such a scenario, after identifying the edges and entity vertices for each value vertex and decrypting the encrypted value vertices, the processing circuitry 102 may execute the selection (e.g., filtering) operation to select edges and entity vertices that are relevant to the hint included in the search query. The database operation (e.g., the intersection operation in the above example) may be executed on the filtered edges and entity vertices. For example, the search query may correspond to 'Washington and First Name: Baker'. In such a scenario, after the edges and entity vertices identification and the decryption of the relevant encrypted value vertices, only the edge 'has first name' coupled to the value vertex 'Baker' is retained. The intersection operation is then executed on the edges and entity vertices retained for value vertex 'Baker' and all the edges and entity vertices identified for value vertex 'Washington'.

Wildcard Encrypted Data Search:

In case of the wildcard data search, the search query may correspond to '% #$*ington'. In such an example, the processing circuitry 102 may determine a data string 'ington' and a wildcard string '% #$*'. Subsequently, the processing circuitry 102 may identify data values 'Wellington' and 'Washington' that are associated with the first reference value '% #$*ington' such that the data values 'Wellington' and 'Washington' include the data string 'ington'. The processing circuitry 102 may search the value index table 116 to identify the data values 'Wellington' and 'Washington' and determine the value IDs 'V2' and 'V8' mapped thereto, respectively. Further, the processing circuitry 102 may search the vertex index table 118 to identify the value IDs 'V2' and 'V8' and determine the vertex IDs 'Y1' and 'H7' mapped thereto, respectively. The processing circuitry 102 may then search the directed property graph 114 of FIG. 3 to identify the value vertices 'dr6*' and 'fthg' having the vertex IDs 'Y1' and 'H7', respectively.

The processing circuitry 102 may then identify edges 'has state' and 'has last name' and corresponding entity vertices for the value vertex 'fthg' in a similar manner as described above. Additionally, the processing circuitry 102 may identify the value vertex 'dr6*' in the directed property graph 114 and track the edge 'has last name' that couples the value vertex 'dr6*' to the entity vertex 'Name1'. A union operation is then executed on the edges and entity vertices identified for value vertices 'dr6*' and 'fthg'. The result of the union operation is the entity vertex 'Name3' coupled to the value vertex 'fthg' by way of the edge 'has last name', the entity vertex 'Address2' coupled to the value vertex 'fthg' by way of the edge 'has state', and the entity vertex 'Name1' coupled to the value vertex 'dr6*' by way of the edge 'has last name'. Further, the processing circuitry 102 identifies that the entity vertex 'Name3' is also coupled to the value vertex 'tjs5' by way of the edge 'has first name', that the entity vertex 'Address2' is also coupled to the value vertex '*hho' by way of the edge 'has pin code', and that entity vertex 'Name1' is also coupled to the value vertex 'hjh@' by way of the edge 'has first name'. The encrypted value vertices are then decrypted in a manner similar to the decryption described in the single-value encrypted data search. Once the data values are obtained, the processing circuitry 102 may generate the response in a manner similar to the wildcard data search described in FIG. 2.

Wildcard Encrypted Information Search:

When the wildcard search query further includes the hint, the search corresponds to the wildcard information search. In such a scenario, after identifying the edges and entity vertices for each encrypted value vertex and decrypting the encrypted value vertices, the processing circuitry 102 may execute the selection (e.g., filtering) operation to select edges and entity vertices that are relevant to the hint included in the search query. The database operation (e.g., the union operation in the above example) may be executed on the filtered edges and entity vertices. For example, the search query may correspond to 'Last Name: % #$*ington'. In such a scenario, after the edges and entity vertices identification and the decryption of the relevant encrypted value vertices, only the edges 'has last name' are retained. The union operation is then executed on the retained edges and entity vertices. Similarity encrypted data search:

In case of the similarity data search, the search query may correspond to 'Washington' and the similarity indicator. In such an example, the processing circuitry 102 may search the value index table 116 to identify the data value 'Washington', determine the similarity code 'I500' mapped to the data value 'Washington', and detect, in the value index table 116, data value 'Wellington' that has the similarity code 'I500' mapped thereto. Further, the processing circuitry 102 may determine the value IDs 'V2' and 'V8' mapped the data values 'Wellington' and 'Washington', respectively. Further, the processing circuitry 102 may search the vertex index table 118 to identify the value IDs 'V2' and 'V8' and determine the vertex IDs 'Y1' and 'H7' mapped thereto, respectively. The processing circuitry 102 may then search the directed property graph 114 of FIG. 3 to identify the value vertices 'dr6*' and 'fthg' having the vertex IDs 'Y1' and 'H7', respectively.

The processing circuitry 102 may then track the edge and entity vertices for the value vertices 'dr6*' and 'fthg', execute a union operation, and track the edge and value vertices for the entity vertices obtained after the union operations. The encrypted value vertices are then decrypted in a manner similar to the decryption described in the single-value encrypted data search. Once the data values are obtained, the processing circuitry 102 may generate the response in a manner similar to the similarity data search described in FIG. 2.

Similarity Encrypted Information Search:

When the similarity search query further includes the hint, the search corresponds to the similarity information search. In such a scenario, after identifying the edges and entity vertices for each encrypted value vertex and decrypting the encrypted value vertices, the processing circuitry 102 may execute the selection (e.g., filtering) operation to select edges and entity vertices that are relevant to the hint included in the search query. The database operation (e.g., the union operation in the above example) may be executed on the filtered edges and entity vertices. For example, the search query may correspond to 'Last Name: Washington' and the similarity indicator. In such a scenario, after the edges and entity vertices identification and the decryption of the relevant encrypted value vertices, only the edges 'has last name' are retained. The union operation is then executed on the retained edges and entity vertices.

FIG. 5 is a block diagram that illustrates a system architecture of a computer system 500 for facilitating the execution of the search in the dataset, in accordance with an embodiment of the present disclosure. An embodiment of the present disclosure, or portions thereof, may be implemented as computer-readable code on the computer system 500. In one example, the processing circuitry 102 of FIG. 1 may be implemented in the computer system 500 using hardware, software, firmware, non-transitory computer-readable media having instructions stored thereon, or a combination thereof and may be implemented in one or more computer systems or other processing systems. Hardware, software, or any combination thereof may embody modules and components used to implement the method of FIGS. 6, 7A-7C, and 8A-8D.

The computer system 500 may include a processor 502 that may be a special-purpose or a general-purpose processing device. The processor 502 may be a single processor or multiple processors. The processor 502 may have one or more processor cores. Further, the processor 502 may be coupled to a communication infrastructure 504, such as a bus, a bridge, a message queue, the communication network 112, a multi-core message-passing scheme, or the like. The computer system 500 may further include a main memory 506 and a secondary memory 508. Examples of the main memory 506 may include random-access memory (RAM), a read-only memory (ROM), or the like. The secondary memory 508 may include a hard disk drive or a removable storage drive, such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer-readable recording media.

The computer system 500 may further include an input/output (I/O) port 510 and a communication interface 512.

The I/O port 510 may include various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communication port, and the like. Data transferred via the communication interface 512 may be signals, such as electronic, electromagnetic, optical, or other signals as will be apparent to a person skilled in the art. The signals may travel via a communications channel, such as the communication network 112, which may be configured to transmit the signals to the various devices that are communicatively coupled to the computer system 500. Examples of the communication channel may include a wired, wireless, and/or optical media such as cable, fiber optics, a phone line, a cellular phone link, a radio frequency link, and the like. The main memory 506 and the secondary memory 508 may refer to non-transitory computer-readable mediums that may provide data that enables the computer system 500 to implement the method illustrated in FIGS. 6, 7A-7C, and 8A-8D.

Figure 6:
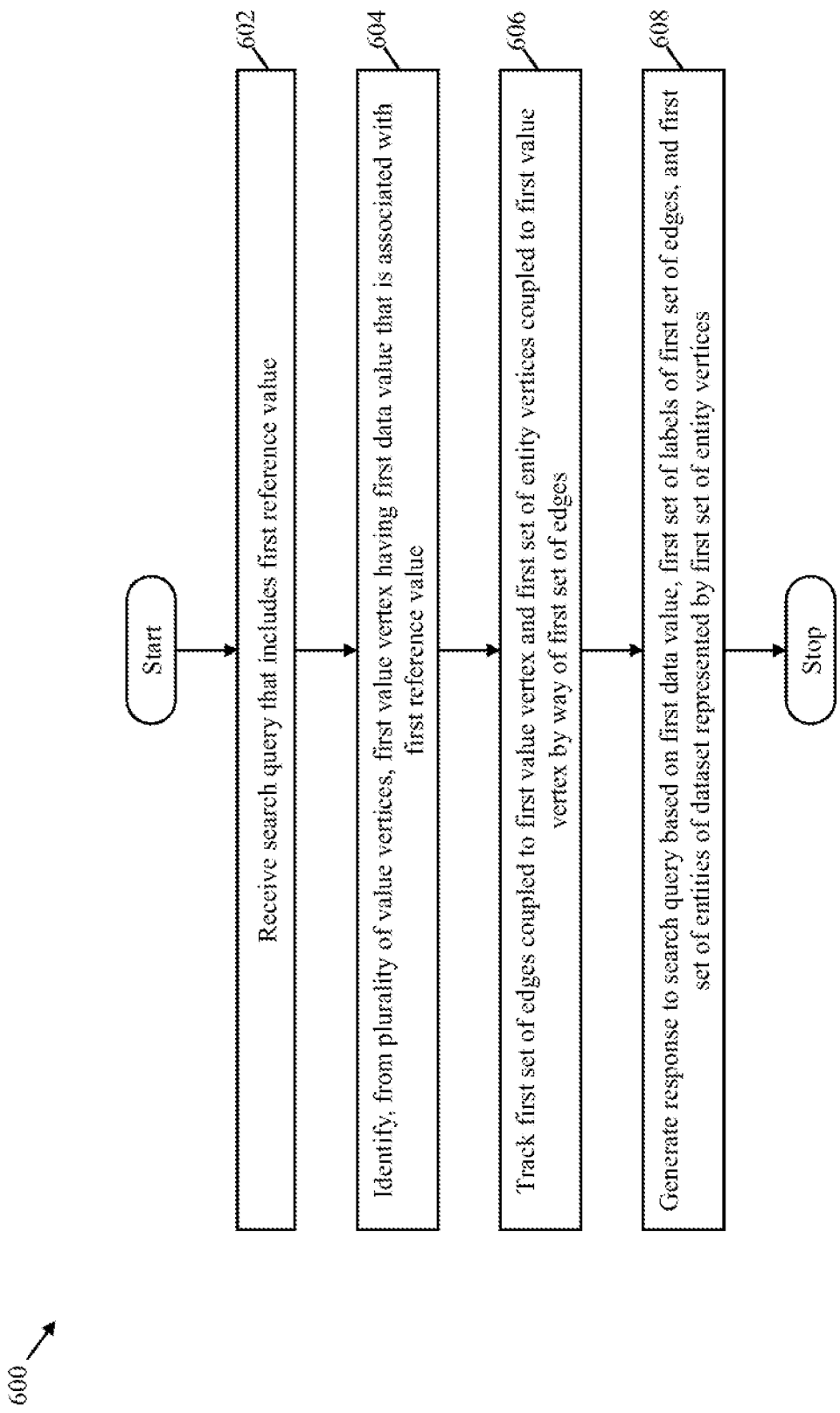
FIG. 6 is a high-level flowchart that illustrates a method for executing the search in the dataset, in accordance with an embodiment of the present disclosure.

FIG. 6 is a high-level flowchart 600 that illustrates a method for executing the search in the dataset, in accordance with an embodiment of the present disclosure. Referring to FIG. 6, at 602, the search query that includes the first reference value is received. The processing circuitry 102 receives the search query that includes the first reference value. The first reference value is to be searched in the directed property graph 114. The directed property graph 114 is derived from the dataset that includes the plurality of entities, the one or more properties associated with each entity, and the one or more data values of the one or more properties, respectively. The directed property graph 114 comprises the plurality of value vertices, the plurality of entity vertices, and the plurality of edges. Each edge couples an entity vertex to a value vertex and includes a label that is indicative of the association between the entity vertex and the value vertex. Each entity vertex corresponds to an entity of the dataset, an associated edge corresponds to a field of the entity, and an associated value vertex corresponds to a data value of the field.

At 604, the first value vertex having the first data value that is associated with the first reference value is identified from the plurality of value vertices. The processing circuitry 102 identifies the first value vertex, from the plurality of value vertices, having the first data value that is associated with the first reference value.

At 606, the first set of edges coupled to the first value vertex, and the first set of entity vertices coupled to the first value vertex by way of the first set of edges are tracked. The processing circuitry 102 tracks the first set of edges coupled to the first value vertex, and the first set of entity vertices coupled to the first value vertex by way of the first set of edges. At 608, the response to the search query is generated based on the first data value, the first set of labels of the first set of edges, and the first set of entities of the dataset represented by the first set of entity vertices. The processing circuitry 102 generates the response.

Figure 7A:
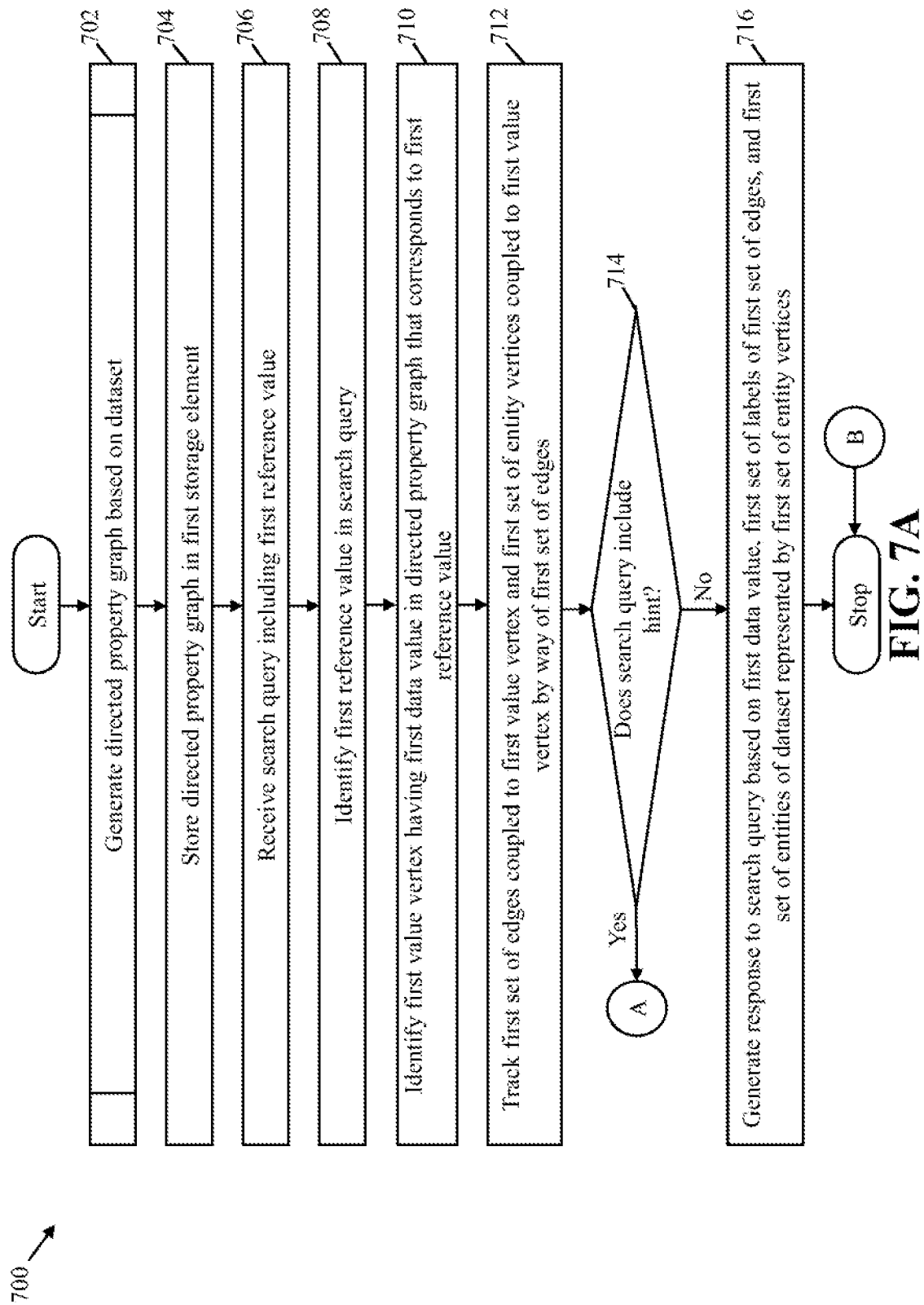
FIGS. 7A-7C, collectively, represent a flowchart that illustrates the method for executing the search in the dataset, in accordance with an embodiment of the present disclosure.
Figure 7B:
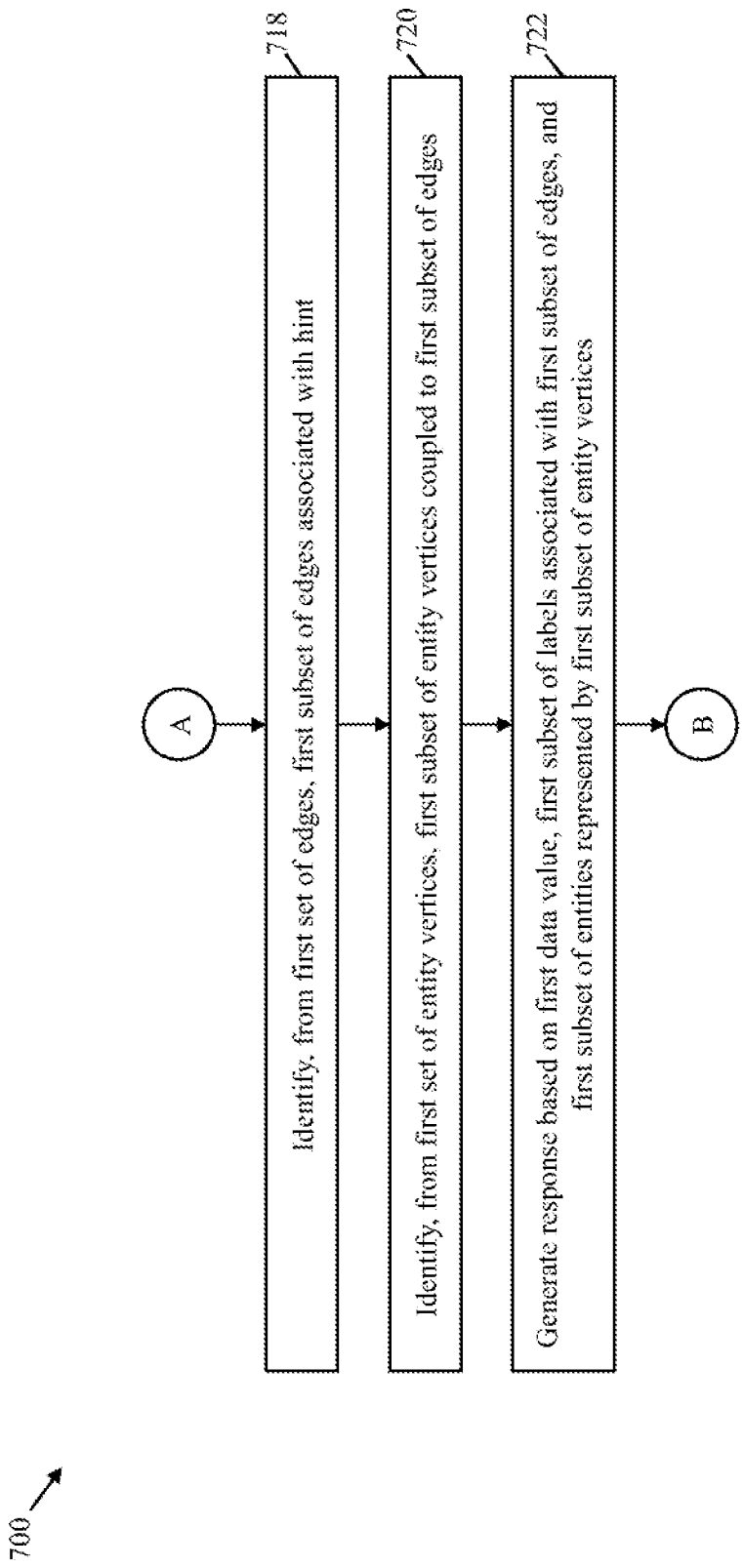
Figure 7C:
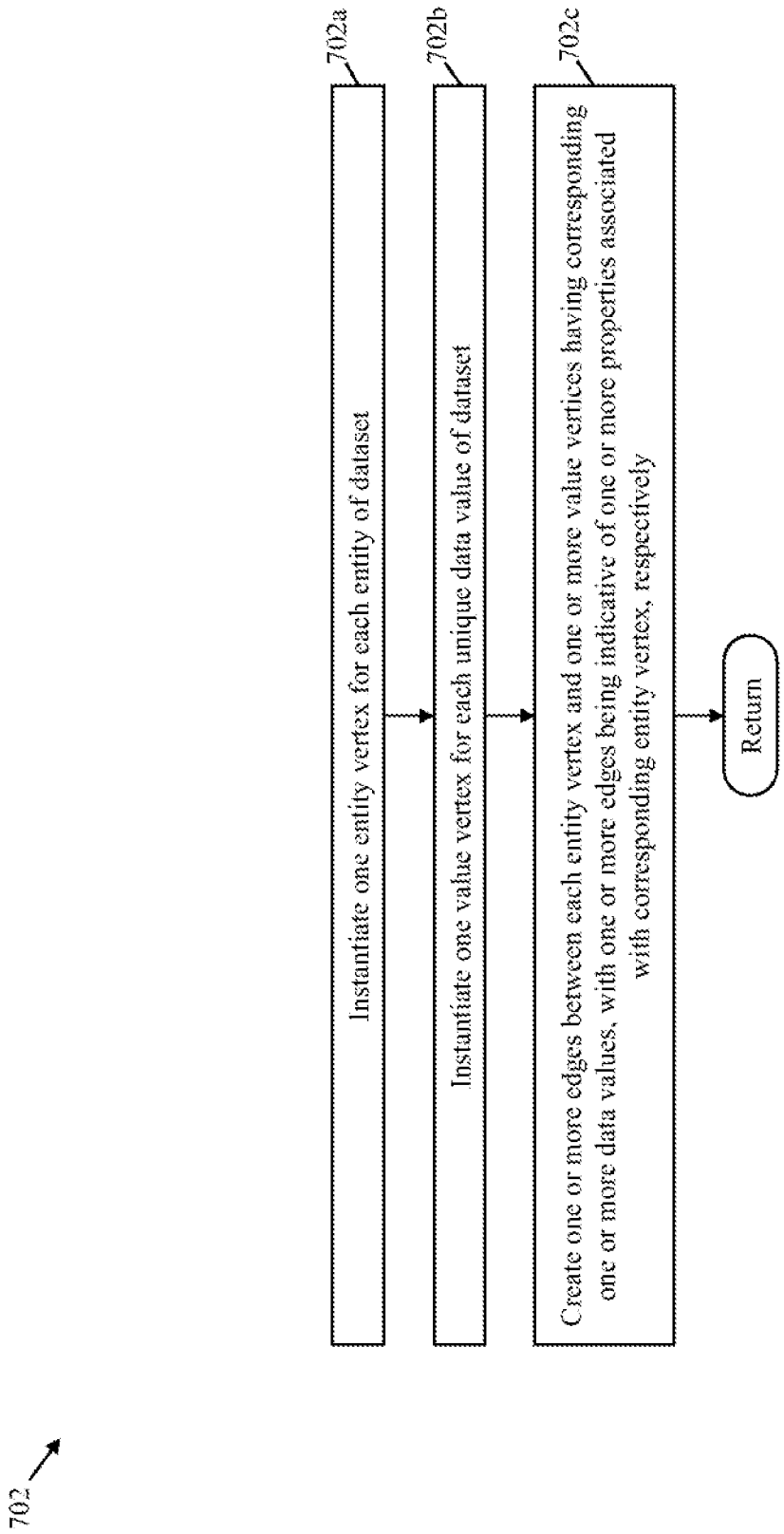

FIGS. 7A-7C, collectively, represent a flowchart 700 that illustrates the method for executing the search in the dataset, in accordance with an embodiment of the present disclosure.

Referring to FIG. 7A, at 702, the directed property graph 114 is generated based on the dataset. The dataset includes the plurality of entities, the one or more properties associated with each entity, and the one or more data values of the one or more properties, respectively. The processing circuitry 102 generates the directed property graph 114. The directed property graph 114 includes the plurality of value vertices, the plurality of entity vertices, and the plurality of edges. Each edge links an entity vertex to a value vertex and includes a label that is indicative of the association between the entity vertex and the value vertex. Each entity vertex corresponds to an entity of the dataset, an associated edge corresponds to a property of the entity, and an associated value vertex corresponds to a data value of the property The process of generation of the directed property graph 114 includes execution of 702a-702c shown in FIG. 7C.

Referring to FIG. 7C, at 702a, one entity vertex is instantiated for each entity of the dataset. The processing circuitry 102 instantiates one entity vertex for each entity of the dataset. At 702b, one value vertex for each unique data value of the dataset is instantiated. The processing circuitry 102 instantiates one value vertex for each unique data value of the dataset. At 702c, one or more edges are created between each entity vertex and one or more value vertices having the corresponding one or more data values, with the one or more edges being indicative of the one or more properties associated with the corresponding entity vertex, respectively. The processing circuitry 102 creates the one or more edges. Subsequently, 704 is executed.

Referring back to FIG. 7A, at 704, the directed property graph 114 is stored in the first storage element 106. The processing circuitry 102 stores the directed property graph 114 in the first storage element 106. At 706, the search query including the first reference value is received. The processing circuitry 102 receives the search query via the user device 104. At 708, the first reference value is identified in the search query. The processing circuitry 102 identifies the first reference value in the search query. At 710, the first value vertex having the first data value that corresponds to the first reference value is identified in the directed property graph 114. The processing circuitry 102 identifies, in the directed property graph 114, the first value vertex having the first data value that corresponds to the first reference value. At 712, the first set of edges coupled to the first value vertex, and the first set of entity vertices coupled to the first value vertex by way of the first set of edges are tracked. The processing circuitry 102 tracks the first set of edges and the first set of entity vertices.

At 714, it is determined whether the search query includes the hint. The processing circuitry 102 determines whether the search query includes the hint associated with the first reference value. When it is determined that the search query does not include the hint, 716 is executed. At 716, the response to the search query is generated based on the first data value, the first set of labels of the first set of edges, and the first set of entities of the dataset represented by the first set of entity vertices. The processing circuitry 102 generates the response.

When it is determined that the search query includes the hint, 718 is executed. Referring to FIG. 7B, at 718, the first subset of edges associated with the hint is identified from the first set of edges. The processing circuitry 102 identifies the first subset of edges from the first set of edges. At 720, the first subset of entity vertices coupled to the first subset of edges is identified from the first set of entity vertices. The processing circuitry 102 identifies, from the first set of entity vertices, the first subset of entity vertices coupled to the first subset of edges. At 722, the response to the search query is generated based on the first data value, the first subset of labels associated with the first subset of edges, and the first subset of entities represented by the first subset of entity vertices. The processing circuitry 102 generates the response.

Although not shown, the processing circuitry 102 may further identify additional edges coupled to each entity vertex of the first set of entity vertices or the first subset of entity vertices, and additional value vertices coupled to each entity vertex by way of the additional edges. In such cases, the response may be generated further based on labels associated with the additional edges and data values of the additional value vertices.

Figure 8A:
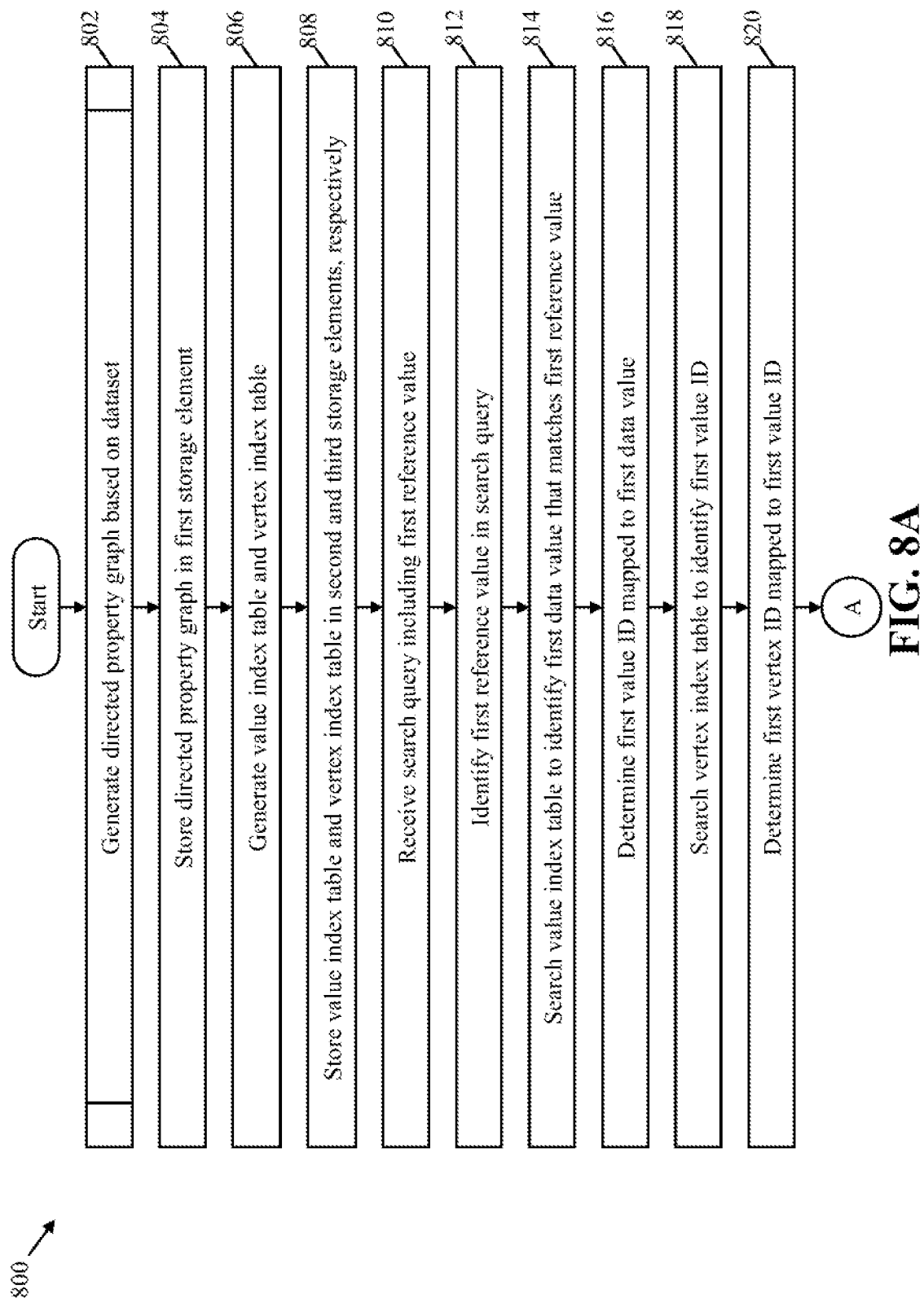
FIGS. 8A-8D, collectively, represent another flowchart that illustrates the method for executing the search in the dataset, in accordance with another embodiment of the present disclosure.

FIGS. 8A-8D, collectively, represent another flowchart 800 that illustrates the method for executing the search in the dataset, in accordance with another embodiment of the present disclosure. Referring to FIG. 8A, at 802, the directed property graph 114 is generated based on the dataset. The processing circuitry 102 generates the directed property graph 114. The generation of the directed property graph 114 includes execution of 802a-802c shown in FIG. 8D.

Figure 8B:
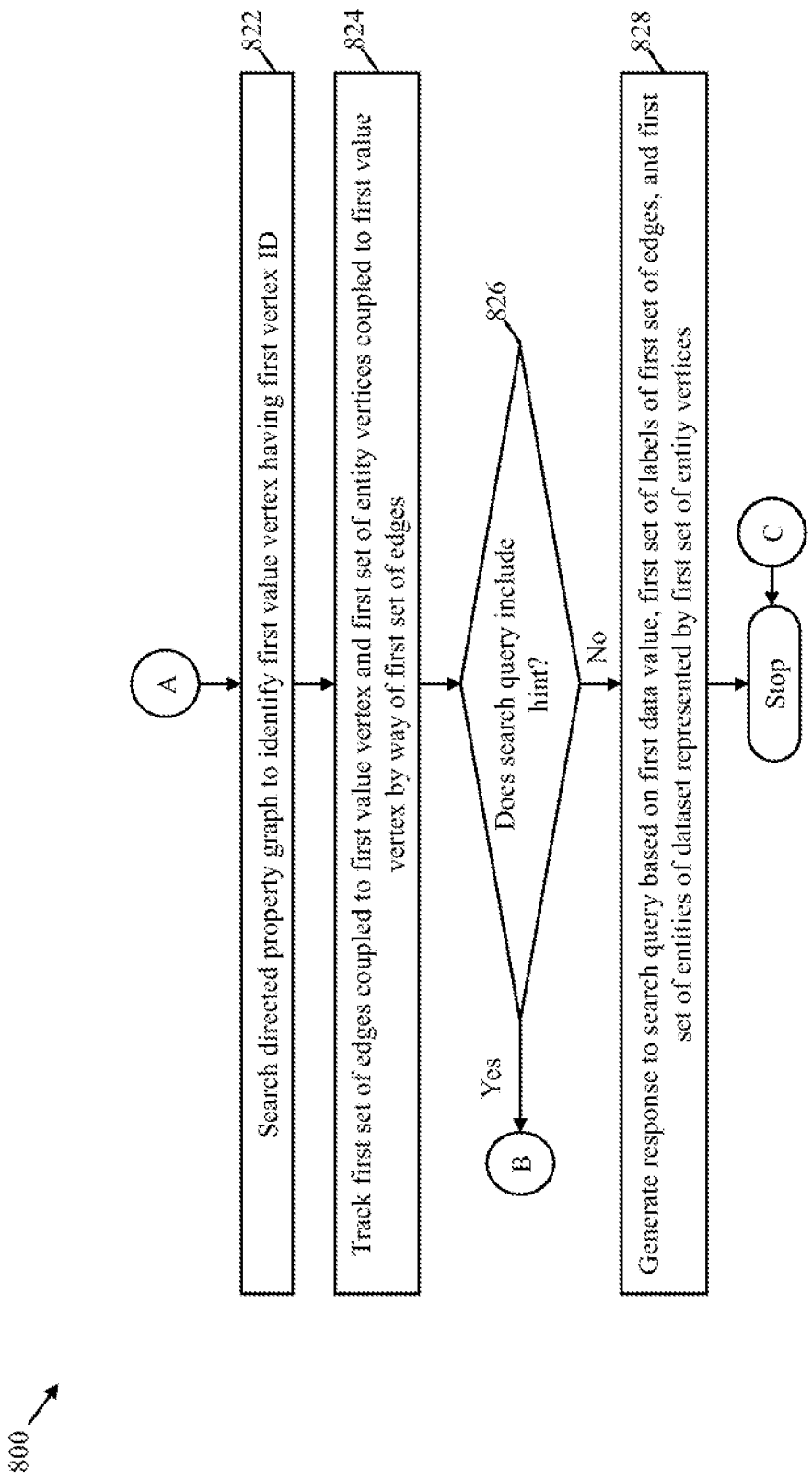
Figure 8C:
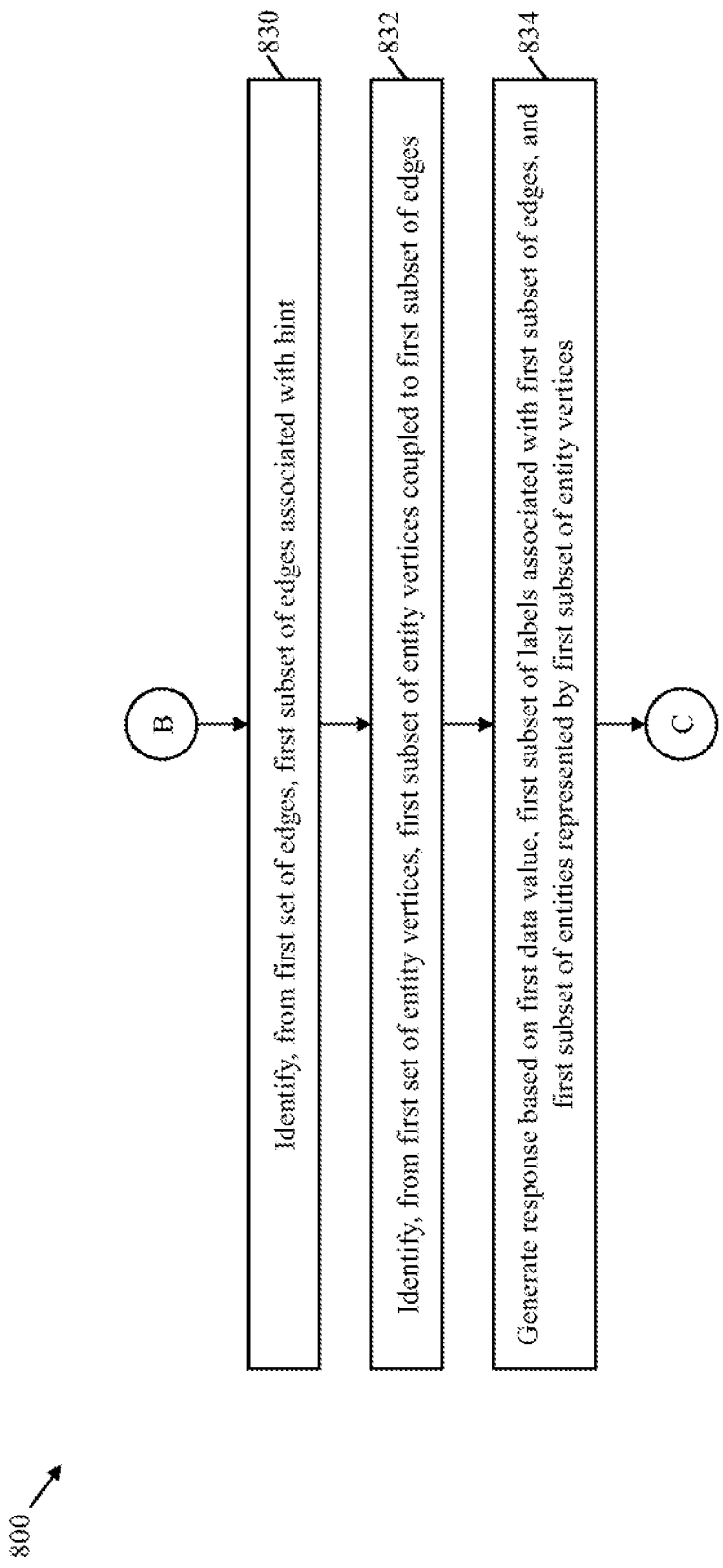
Figure 8D:
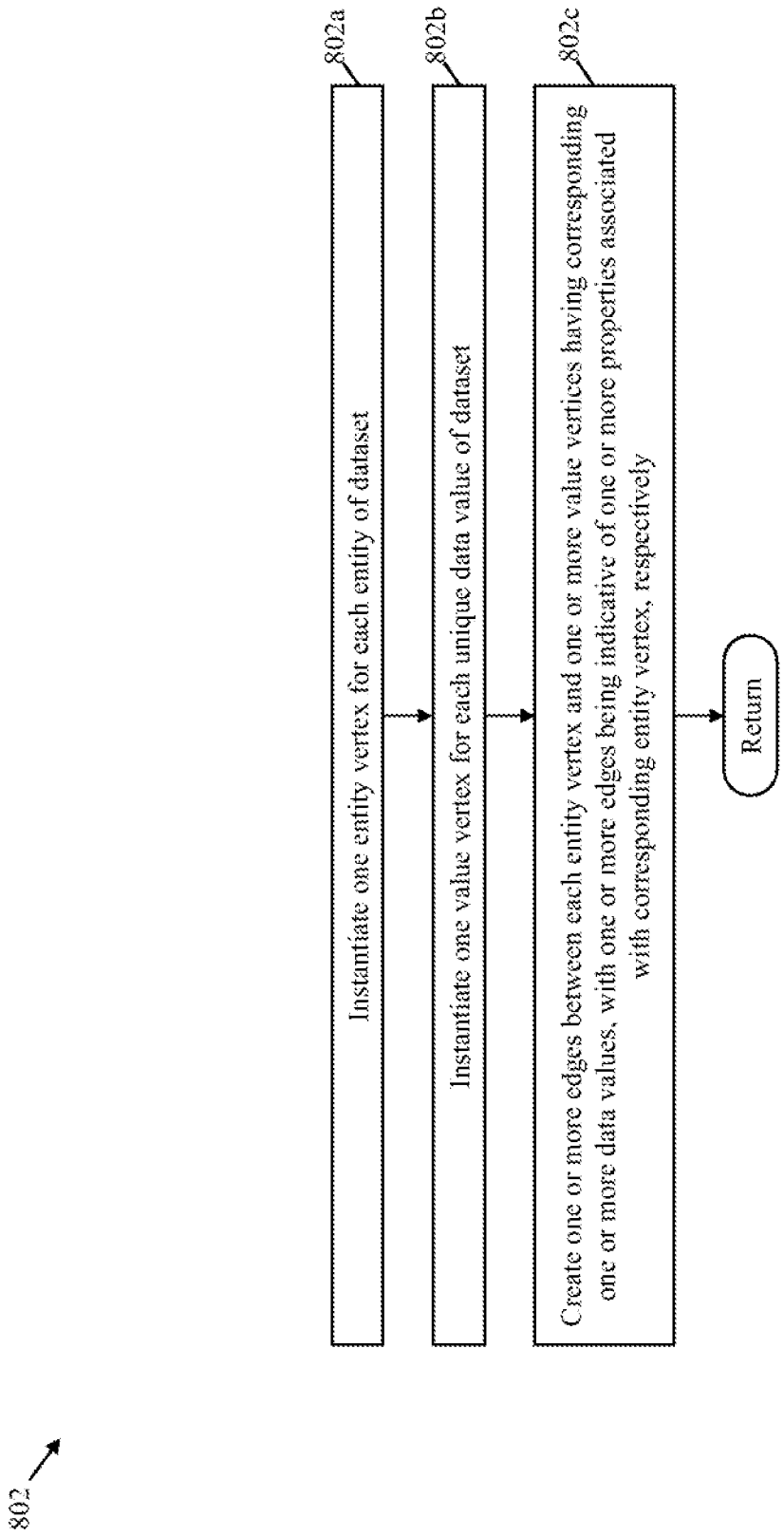

Referring to FIG. 8D, at 802a, one entity vertex is instantiated for each entity of the dataset. The processing circuitry 102 instantiates one entity vertex for each entity of the dataset. At 802b, one value vertex for each unique data value of the dataset is instantiated. The processing circuitry 102 instantiates one value vertex for each unique data value of the dataset. At 802c, one or more edges are created between each entity vertex and one or more value vertices having the corresponding one or more data values, with the one or more edges being indicative of the one or more properties associated with the corresponding entity vertex, respectively. The processing circuitry 102 creates the one or more edges. Subsequently, 804 is executed.

Referring back to FIG. 8A, at 804, the directed property graph 114 is stored in the first storage element 106. The processing circuitry 102 stores the directed property graph 114 in the first storage element 106. At 806, the value index table 116 and the vertex index table 118 are generated. The processing circuitry 102 generates the value index table 116 and the vertex index table 118. The value index table 116 includes the mapping between each unique data value of the directed property graph 114 and the value ID assigned to the corresponding unique data value. The vertex index table 118 includes the mapping between the value ID assigned to each unique data value and the vertex ID of the corresponding value vertex. At 808, the value index table 116 and the vertex index table 118 are stored in the second storage element 108 and the third storage element 110, respectively. The processing circuitry 102 stores the value index table 116 and the vertex index table 118 in the second storage element 108 and the third storage element 110, respectively.

At 810, the search query including the first reference value is received. The processing circuitry 102 receives the search query via the user device 104. At 812, the first reference value is identified in the search query. The processing circuitry 102 identifies the first reference value in the search query.

At 814, the value index table 116 is searched to identify the first data value that matches the first reference value. The processing circuitry 102 searches the value index table 116 to identify the first data value that matches the first reference value. At 816, the first value ID mapped to the first data value is determined. The processing circuitry 102 determines the first value ID that is mapped to the first data value. At 818, the vertex index table 118 is searched to identify the first value ID. The processing circuitry 102 searches the vertex index table 118 to identify the first value ID. At 820 the first vertex ID mapped to the first value ID is determined. The processing circuitry 102 determines the first vertex ID mapped to the first value ID.

Referring to FIG. 8B, at 822, the directed property graph 114 is searched to identify the first value vertex having the first vertex ID. The processing circuitry 102 searches the directed property graph 114 to identify the first value vertex having the first vertex ID. At 824, the first set of edges coupled to the first value vertex, and the first set of entity vertices coupled to the first value vertex by way of the first set of edges are tracked. The processing circuitry 102 tracks the first set of edges and the first set of entity vertices.

At 826, it is determined whether the search query includes the hint. The processing circuitry 102 determines whether the search query includes the hint associated with the first reference value. When it is determined that the search query does not include the hint, 828 is executed. At 828, the response to the search query is generated based on the first data value, the first set of labels of the first set of edges, and the first set of entities of the dataset represented by the first set of entity vertices. The processing circuitry 102 generates the response.

When it is determined that the search query includes the hint, 830 is executed. Referring to FIG. 8C, at 830, the first subset of edges associated with the hint is identified from the first set of edges. The processing circuitry 102 identifies the first subset of edges from the first set of edges. At 832, the first subset of entity vertices coupled to the first subset of edges is identified from the first set of entity vertices. The processing circuitry 102 identifies, from the first set of entity vertices, the first subset of entity vertices coupled to the first subset of edges. At 834, the response to the search query is generated based on the first data value, the first subset of labels associated with the first subset of edges, and the first subset of entities represented by the first subset of entity vertices. The processing circuitry 102 generates the response.

Although not shown, the processing circuitry 102 may further identify additional edges coupled to each entity vertex of the first set of entity vertices or the first subset of entity vertices, and additional value vertices coupled to each entity vertex by way of the additional edges. In such cases, the response may be generated further based on labels associated with the additional edges and data values of the additional value vertices.

The disclosed embodiments encompass numerous advantages including an optimal organization and management of data. The disclosed systems and methods ensure an optimal security of the dataset stored in the directed property graph 114. Further, the search approach disclosed herein allows for data retrieval in significantly less time. Also, the disclosed search approach allows for a significantly reduced latency as for each reference value of the search query, a single value vertex is to be identified. An additional advantage of such use of the directed property graph 114 includes a significantly reduced cost (for example, time complexity and cost complexity) of data retrieval. Further, the execution of such searches does not have a prerequisite of knowledge of the underlying schema (i.e., ontology) of the directed property graph 114. Hence, the database operations may be executed with significant ease and reduced time consumption.

Certain embodiments of the present disclosure may be found in the disclosed systems, methods, and non-transitory computer-readable medium, for executing searches in the dataset. Exemplary aspects of the present disclosure provide the methods and the systems for executing searches in the dataset. The methods and systems include various operations performed by the processing circuitry 102. The processing circuitry 102 is configured to generate the directed property graph 114 based on the dataset that includes the plurality of entities, the one or more properties associated with each entity, and the one or more data values of the one or more properties, respectively. The processing circuitry 102 may be further configured to instantiate one entity vertex for each entity of the plurality of entities, instantiate one value vertex for each unique data value of the dataset, and create one or more edges between each entity vertex and one or more value vertices having the corresponding one or more data values, respectively. The one or more edges are indicative of the one or more properties associated with the corresponding entity vertex, respectively. The processing circuitry 102 may be coupled to the first storage element 106, and configured to store the directed property graph 114, derived from the dataset, in the first storage element 106. The directed property graph 114 thus includes the plurality of value vertices, the plurality of entity vertices, and the plurality of edges. Each edge couples an entity vertex to a value vertex and comprises a label that is indicative of an association between the entity vertex and the value vertex. Each entity vertex corresponds to an entity of the dataset, an associated edge corresponds to a property of the entity, and an associated value vertex corresponds to a data value of the property. The processing circuitry 102 may be further configured to receive the search query that comprises the first reference value. The processing circuitry 102 may be further configured to identify, from the plurality of value vertices, the first value vertex having the first data value that is associated with the first reference value. The processing circuitry 102 may be further configured to track (i) the first set of edges, of the plurality of edges, coupled to the first value vertex and (ii) the first set of entity vertices, of the plurality of entity vertices, coupled to the first value vertex by way of the first set of edges. The processing circuitry 102 may be further configured to generate the response to the search query based on the first data value, the first set of labels of the first set of edges, and the first set of entities of the dataset represented by the first set of entity vertices.

In some embodiments, the processing circuitry 102 may be further configured to identify, for each entity vertex of the first set of entity vertices, one or more additional value vertices coupled thereto by way of one or more additional edges, respectively. The response is generated further based on the one or more labels associated with the one or more additional edges and the one or more data values associated with the one or more additional value vertices of each entity vertex of the first set of entity vertices, respectively.

In some embodiments, the disclosed systems and methods for executing searches in the dataset further include the second storage element 108 and the third storage element 110. The second storage element 108 may be configured to store the value index table 116 comprising the mapping between each unique data value of the directed property graph 114 and the value ID assigned to the corresponding unique data value. The third storage element 110 may be configured to store the vertex index table 118 comprising the mapping between the value ID assigned to each unique data value and the vertex ID of the corresponding value vertex. The processing circuitry 102 identifies the first value vertex associated with the first reference value based on the value index table 116 and the vertex index table 118.

In some embodiments, the value ID assigned to each unique data value is the encrypted version of the corresponding unique data value.

In some embodiments, the processing circuitry 102 may be further configured to search the value index table 116 to identify the first data value that matches the first reference value of the search query. The processing circuitry 102 may be further configured to determine the first value ID mapped to the first data value, search the vertex index table 118 to identify the first value ID, and determine the first vertex ID mapped to the first value ID. The processing circuitry 102 may be further configured to search the directed property graph 114 to identify the first value vertex having the first vertex ID.

In some embodiments, the first value vertex may be in the encrypted format. In the vertex index table 118, each vertex ID is further mapped to a decryption technique associated with the corresponding value vertex. The processing circuitry 102 may be further configured to identify the first decryption technique mapped to the first vertex ID of the first value vertex in the vertex index table 118 and decrypt the first value vertex using the first decryption technique to obtain the first data value thereof.

In some embodiments, the processing circuitry 102 may be further configured to identify, for each entity vertex of the first set of entity vertices, one or more additional value vertices coupled thereto by way of one or more additional edges, respectively. The one or more additional value vertices may be in the encrypted format.

In some embodiments, the processing circuitry 102 may be further configured to search the vertex index table 118 to identify one or more vertex IDs of the one or more additional value vertices, respectively. In the vertex index table 118, each vertex ID is further mapped to the decryption technique associated with the corresponding value vertex. The processing circuitry 102 may be further configured to determine the one or more decryption techniques and the one or more value IDs mapped to the one or more vertex IDs, respectively. The processing circuitry 102 may be further configured to decrypt the one or more additional value vertices to obtain the one or more data values thereof based on the one or more value IDs and the one or more decryption techniques, respectively. The response is generated further based on one or more labels associated with the one or more additional edges and the decrypted one or more data values associated with the one or more additional value vertices of each entity vertex of the first set of entity vertices, respectively.

In some embodiments, the processing circuitry 102 may be further configured to search the vertex index table 118 to identify one or more vertex IDs of the one or more additional value vertices, respectively, determine one or more value IDs mapped to the one or more vertex IDs, respectively, search the value index table 116 to identify the one or more value IDs, and determine the one or more data values mapped to the one or more value IDs, respectively. The response is further generated based on one or more labels associated with the one or more additional edges and the one or more data values associated with the one or more additional value vertices of each entity vertex of the first set of entity vertices, respectively.

In some embodiments, the processing circuitry 102 may be further configured to identify, based on the search query, the second value vertex in conjunction with the first value vertex. The processing circuitry 102 may be further configured to track (i) the second set of edges, of the plurality of edges, coupled to the second value vertex and (ii) the second set of entity vertices, of the plurality of entity vertices, coupled to the second value vertex by way of the second set of edges. The processing circuitry 102 generates the response further based on the second set of labels of the second set of edges and the second set of entities of the dataset represented by the second set of entity vertices.

In some embodiments, the response corresponds to the output of the database operation executed on (i) the first set of labels and the first set of entities and (ii) the second set of labels and the second set of entities.

In some embodiments, the search query further comprises the similarity indicator to indicate that the search is to be executed for the first reference value and at least one data value that is similar to the first reference value. In the value index table 116, each unique data value of the directed property graph 114 and the associated value ID are further mapped to the similarity code assigned thereto. The identical similarity code of two or more data values is indicative of similarity therebetween. The second value vertex is similar to the first value vertex such that the second value vertex has the second data value that is similar to the first data value. The processing circuitry 102 identifies the second value vertex based on the value index table 116 and the vertex index table 118.

In some embodiments, the processing circuitry 102 may be further configured to search the value index table 116 to identify the first data value that matches the first reference value of the search query. The processing circuitry 102 may be further configured to determine the first similarity code mapped to the first data value. The processing circuitry 102 may be further configured to detect, in the value index table 116, the second data value that has the first similarity code mapped thereto. The processing circuitry 102 may be further configured to determine the first value ID mapped to the first data value and the second value ID mapped to the second data value. The processing circuitry 102 may be further configured to search the vertex index table 118 to identify the first value ID and the second value ID, determine the first vertex ID mapped to the first value ID and the second vertex ID mapped to the second value ID, and search the directed property graph 114 to identify the first value vertex having the first vertex ID and the second value vertex having the second vertex ID.

In some embodiments, the first reference value includes the data string and the wildcard string. The processing circuitry 102 may be further configured to search the value index table 116 to identify the first data value and the second data value of the second value vertex such that the first string of the first data value and the second string of the second data value match the data string of the first reference value. The processing circuitry 102 may be further configured to determine the first value ID mapped to the first data value and the second value ID mapped to the second data value and search the vertex index table 118 to identify the first value ID and the second value ID. Further, the processing circuitry 102 may be configured to determine the first vertex ID mapped to the first value ID and the second vertex ID mapped to the second value ID and search the directed property graph 114 to identify the first value vertex having the first vertex ID and the second value vertex having the second vertex ID.

In some embodiments, the search query further includes the second reference value. The processing circuitry 102 may be further configured to search the value index table 116 to identify the first data value and the second data value of the second value vertex such that the first data value and the second data value match the first reference value and the second reference value, respectively. The processing circuitry 102 may be further configured to determine the first value ID mapped to the first data value and the second value ID mapped to the second data value, search the vertex index table 118 to identify the first value ID and the second value ID, and determine the first vertex ID mapped to the first value ID and the second vertex ID mapped to the second value ID. Further, the processing circuitry 102 may be configured to search the directed property graph 114 to identify the first value vertex having the first vertex ID and the second value vertex having the second vertex ID.

In some embodiments, the search query further includes the hint associated with the first reference value. The processing circuitry 102 may be further configured to identify, from the first set of edges and the second set of edges, the first subset of edges and the second subset of edges that are associated with the hint, respectively. The processing circuitry 102 may be further configured to identify, from the first set of entity vertices and the second set of entity vertices, the first subset of entity vertices and the second subset of entity vertices that are coupled to the first subset of edges and the second subset of edges, respectively. The response is generated based on (i) the first subset of labels, of the first set of labels, associated with the first subset of edges, (ii) the first subset of entities, of the first set of entities, represented by the first subset of entity vertices, (iii) the second subset of labels, of the second set of labels, associated with the second subset of edges, and (iv) the second subset of entities, of the second set of entities, represented by the second subset of entity vertices.

In some embodiments, the response corresponds to the output of the database operation executed on (i) the first subset of labels and the first subset of entities and (ii) the second subset of labels and the second subset of entities.

In some embodiments, the value index table 116 and the vertex index table 118 are encrypted. The processing circuitry 102 may be further configured to decrypt the value index table 116 and the vertex index table 118 before searching the value index table 116 and the vertex index table 118.

In some embodiments, the first storage element 106, the second storage element 108, and the third storage element 110 correspond to decentralized data storages.

In some embodiments, the first value vertex includes metadata that is the descriptor of the first data value. The response for the search query is generated further based on the metadata of the first value vertex.

In some embodiments, each entity vertex corresponds to the parent type or the child type. The parent type entity vertex is coupled to the child type entity vertex by way of the contextualized edge that comprises the identifier of the parent type entity vertex, in addition to the label that is indicative of the association between the parent type entity vertex and the child type entity vertex. During the execution of the search, in case the first set of entity vertices includes at least one child type entity vertex, the response is further generated based on the identifier of the corresponding parent type entity vertex.

In some embodiments, the search query further includes the hint associated with the first reference value. The processing circuitry 102 may be further configured to identify, from the first set of edges, the first subset of edges that is associated with the hint. The processing circuitry 102 may be further configured to identify, from the first set of entity vertices, the first subset of entity vertices that is coupled to the first subset of edges. The response is generated based on (i) the first subset of labels, of the first set of labels, associated with the first subset of edges and (ii) the first subset of entities, of the first set of entities, represented by the first subset of entity vertices.

In some embodiments, the processing circuitry 102 may be further configured to identify, for each entity vertex of the first subset of entity vertices, one or more value vertices coupled thereto by way of one or more edges, respectively. The response is generated further based on (i) the one or more labels associated with the one or more edges, respectively, of each entity vertex of the first subset of entity vertices and (ii) the one or more data values associated with the one or more value vertices, respectively, of each entity vertex of the first subset of entity vertices.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for executing the search in the dataset. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. A system for executing a search in a dataset, the system comprising:
   a first storage element configured to store a directed property graph that is derived from the dataset, wherein the directed property graph comprises a plurality of value vertices, a plurality of entity vertices, and a plurality of edges, wherein each edge couples an entity vertex to a value vertex and comprises a label that is indicative of an association between the entity vertex and the value vertex, and wherein each entity vertex corresponds to an entity of the dataset, an associated edge corresponds to a property of the entity, and an associated value vertex corresponds to a data value of the property; and
   processing circuitry that is coupled to the first storage element, and configured to:
      receive a search query that comprises a first reference value;
      identify, from the plurality of value vertices, a first value vertex having a first data value that is associated with the first reference value;
      track (i) a first set of edges, of the plurality of edges, coupled to the first value vertex and (ii) a first set of entity vertices, of the plurality of entity vertices, coupled to the first value vertex by way of the first set of edges; and generate a response to the search query based on the first data value, a first set of labels of the first set of edges, and a first set of entities of the dataset represented by the first set of entity vertices.

2. The system of 1, wherein the dataset comprises a plurality of entities, one or more properties associated with each entity, and one or more data values of the one or more properties, respectively, wherein the processing circuitry is further configured to generate the directed property graph based on the dataset and store the directed property graph in the first storage element, and wherein, to generate the directed property graph, the processing circuitry is further configured to (i) instantiate one entity vertex for each entity of the plurality of entities, (ii) instantiate one value vertex for each unique data value of the dataset, and (iii) create one or more edges between each entity vertex and one or more value vertices having the corresponding one or more data values, with the one or more edges being indicative of the one or more properties associated with the corresponding entity vertex, respectively.

3. The system of 1, wherein the processing circuitry is further configured to identify, for each entity vertex of the first set of entity vertices, one or more value vertices coupled thereto by way of one or more edges, respectively, and wherein the response is generated further based on (i) one or more labels associated with the one or more edges of each entity vertex of the first set of entity vertices and (ii) one or more data values associated with the one or more value vertices of each entity vertex of the first set of entity vertices.

4. The system of 1, further comprising:
a second storage element configured to store a value index table comprising a mapping between each unique data value of the directed property graph and a value identifier (ID) assigned to the corresponding unique data value; and
a third storage element configured to store a vertex index table comprising a mapping between the value ID assigned to each unique data value and a vertex ID of the corresponding value vertex, wherein the processing circuitry identifies the first value vertex associated with the first reference value based on the value index table and the vertex index table.

5. The system of 4, wherein the value ID assigned to each unique data value is an encrypted version of the corresponding unique data value.

6. The system of 4, wherein the processing circuitry is further configured to:
search the value index table to identify the first data value that matches the first reference value of the search query;
determine a first value ID mapped to the first data value;
search the vertex index table to identify the first value ID;
determine a first vertex ID mapped to the first value ID; and
search the directed property graph to identify the first value vertex having the first vertex ID.

7. The system of 4, wherein the first value vertex is in an encrypted format, wherein in the vertex index table, each vertex ID is further mapped to a decryption technique associated with the corresponding value vertex, and wherein the processing circuitry is further configured to identify a first decryption technique mapped to a first vertex ID of the first value vertex in the vertex index table and decrypt the first value vertex using the first decryption technique to obtain the first data value thereof.

8. The system of 4, wherein the processing circuitry is further configured to:
identify, for each entity vertex of the first set of entity vertices, one or more value vertices coupled thereto by way of one or more edges, respectively, wherein the one or more value vertices are in an encrypted format;
search the vertex index table to identify one or more vertex IDs of the one or more value vertices, respectively, wherein in the vertex index table, each vertex ID is further mapped to a decryption technique associated with the corresponding value vertex;
determine one or more decryption techniques and one or more value IDs mapped to the one or more vertex IDs, respectively; and
decrypt the one or more value vertices to obtain one or more data values thereof based on the one or more value IDs and the one or more decryption techniques, respectively, wherein the response is generated further based on (i) one or more labels associated with the one or more edges of each entity vertex of the first set of entity vertices and (ii) the decrypted one or more data values of each entity vertex of the first set of entity vertices.

9. The system of 4, wherein the processing circuitry is further configured to:
identify, for each entity vertex of the first set of entity vertices, one or more value vertices coupled thereto by way of one or more edges, respectively, wherein the one or more value vertices are in encrypted format;
search the vertex index table to identify one or more vertex IDs of the one or more value vertices, respectively;
determine one or more value IDs mapped to the one or more vertex IDs, respectively;
search the value index table to identify the one or more value IDs; and
determine the one or more data values mapped to the one or more value IDs, respectively, wherein the response is further generated based on (i) one or more labels associated with the one or more edges of each entity vertex of the first set of entity vertices and (ii) the one or more data values of each entity vertex of the first set of entity vertices.

10. The system of 4, wherein the processing circuitry is further configured to:
identify, based on the search query, a second value vertex in conjunction with the first value vertex; and
track (i) a second set of edges, of the plurality of edges, coupled to the second value vertex and (ii) a second set of entity vertices, of the plurality of entity vertices, coupled to the second value vertex by way of the second set of edges, wherein the processing circuitry generates the response further based on a second set of labels of the second set of edges and a second set of entities of the dataset represented by the second set of entity vertices.

11. The system of 10, wherein the response corresponds to an output of a database operation executed on (i) the first set of labels and the first set of entities and (ii) the second set of labels and the second set of entities.

12. The system of 10, wherein the search query further comprises a similarity indicator to indicate that the search is to be executed for the first reference value and at least one data value that is similar to the first reference value, wherein in the value index table, each unique data value of the directed property graph and the associated value ID are further mapped to a similarity code assigned thereto, where an identical similarity code of two or more data values is indicative of similarity therebetween, wherein the second value vertex is similar to the first value vertex such that the second value vertex has a second data value that is similar to the first data value, and wherein the processing circuitry identifies the second value vertex based on the value index table and the vertex index table.

13. The system of 12, wherein the processing circuitry is further configured to:
search the value index table to identify the first data value that matches the first reference value of the search query;
determine a first similarity code mapped to the first data value;
detect, in the value index table, the second data value that has the first similarity code mapped thereto;
determine a first value ID mapped to the first data value and a second value ID mapped to the second data value;
search the vertex index table to identify the first value ID and the second value ID;
determine a first vertex ID mapped to the first value ID and a second vertex ID mapped to the second value ID; and
search the directed property graph to identify the first value vertex having the first vertex ID and the second value vertex having the second vertex ID.

14. The system of 10,
wherein the first reference value comprises a data string and a wildcard string, and
wherein the processing circuitry is further configured to:
search the value index table to identify the first data value and a second data value of the second value vertex such that a first string of the first data value and a second string of the second data value match the data string of the first reference value;
determine a first value ID mapped to the first data value and a second value ID mapped to the second data value;
search the vertex index table to identify the first value ID and the second value ID;
determine a first vertex ID mapped to the first value ID and a second vertex ID mapped to the second value ID; and
search the directed property graph to identify the first value vertex having the first vertex ID and the second value vertex having the second vertex ID.

15. The system of 10,
wherein the search query further comprises a second reference value, and
wherein the processing circuitry is further configured to:
search the value index table to identify the first data value and a second data value of the second value vertex such that the first data value and the second data value match the first reference value and the second reference value, respectively;
determine a first value ID mapped to the first data value and a second value ID mapped to the second data value;
search the vertex index table to identify the first value ID and the second value ID;
determine a first vertex ID mapped to the first value ID and a second vertex ID mapped to the second value ID; and
search the directed property graph to identify the first value vertex having the first vertex ID and the second value vertex having the second vertex ID.

16. The system of 10, wherein the search query further comprises a hint associated with the first reference value, wherein the processing circuitry is further configured to (i) identify, from the first set of edges and the second set of edges, a first subset of edges and a second subset of edges that are associated with the hint, respectively, and (ii) identify, from the first set of entity vertices and the second set of entity vertices, a first subset of entity vertices and a second subset of entity vertices that are coupled to the first subset of edges and the second subset of edges, respectively, and wherein the response is generated based on (i) a first subset of labels, of the first set of labels, associated with the first subset of edges, (ii) a first subset of entities, of the first set of entities, represented by the first subset of entity vertices, (iii) a second subset of labels, of the second set of labels, associated with the second subset of edges, and (iv) a second subset of entities, of the second set of entities, represented by the second subset of entity vertices.

17. The system of 16, wherein the response corresponds to an output of a database operation executed on (i) the first subset of labels and the first subset of entities and (ii) the second subset of labels and the second subset of entities.

18. The system of 4, wherein the value index table and the vertex index table are encrypted, and wherein the processing circuitry is further configured to decrypt the value index table and the vertex index table before searching the value index table and the vertex index table.

19. The system of 4, wherein the first storage element, the second storage element, and the third storage element correspond to decentralized data storages.

20. The system of 1, wherein the first value vertex comprises metadata that is a descriptor of the first data value, and wherein the response for the search query is generated further based on the metadata of the first value vertex.

21. The system of 1,
wherein the search query further comprises a hint associated with the first reference value,
wherein the processing circuitry is further configured to (i) identify, from the first set of edges, a first subset of edges that is associated with the hint and (ii) identify, from the first set of entity vertices, a first subset of entity vertices that is coupled to the first subset of edges, and
wherein the response is generated based on (i) a first subset of labels, of the first set of labels, associated with the first subset of edges and (ii) a first subset of entities, of the first set of entities, represented by the first subset of entity vertices.

22. The system of 21, wherein the processing circuitry is further configured to identify, for each entity vertex of the first subset of entity vertices, one or more value vertices coupled thereto by way of one or more edges, respectively, and wherein the response is generated further based on (i) one or more labels associated with the one or more edges of each entity vertex of the first subset of entity vertices and (ii) one or more data values associated with the one or more value vertices of each entity vertex of the first subset of entity vertices.

23. A method for executing a search in a dataset, the method comprising:
receiving, by processing circuitry, a search query that comprises a first reference value, wherein the first reference value is to be searched in a directed property graph that is derived from the dataset, wherein the directed property graph comprises a plurality of value vertices, a plurality of entity vertices, and a plurality of edges, wherein each edge couples an entity vertex to a value vertex and comprises a label that is indicative of an association between the entity vertex and the value vertex, and wherein each entity vertex corresponds to an entity of the dataset, an associated edge corresponds to a field of the entity, and an associated value vertex corresponds to a data value of the field;

identifying, by the processing circuitry, from the plurality of value vertices, a first value vertex having a first data value that is associated with the first reference value;

tracking, by the processing circuitry, (i) a first set of edges, of the plurality of edges, coupled to the first value vertex and (ii) a first set of entity vertices, of the plurality of entity vertices, coupled to the first value vertex by way of the first set of edges; and generating, by the processing circuitry, a response to the search query based on the first data value, a first set of labels of the first set of edges, and a first set of entities of the dataset represented by the first set of entity vertices.

What is claimed is:

1. A system for executing a search in a dataset, the system comprising:
   a first storage element configured to store a directed property graph that is derived from the dataset, wherein the directed property graph comprises a plurality of value vertices, a plurality of entity vertices, and a plurality of edges, wherein each edge couples an entity vertex to a value vertex and comprises a label that is indicative of an association between the entity vertex and the value vertex, and wherein each entity vertex corresponds to an entity of the dataset, an associated edge corresponds to a property of the entity, and an associated value vertex corresponds to a data value of the property;
   a second storage element configured to store a value index table comprising a mapping between each unique data value of the directed property graph and a value identifier (ID) assigned to the corresponding unique data value;
   a third storage element configured to store a vertex index table comprising a mapping between the value ID assigned to each unique data value and a vertex ID of the corresponding value vertex; and
   processing circuitry that is coupled to the first storage element, and configured to:
   receive a search query that comprises a first reference value;
   identify, from the plurality of value vertices, a first value vertex having a first data value that is associated with the first reference value, wherein the identification is based on the value index table and the vertex index table;
   track (i) a first set of edges, of the plurality of edges, coupled to the first value vertex and (ii) a first set of entity vertices, of the plurality of entity vertices, coupled to the first value vertex by way of the first set of edges; and
   generate a response to the search query based on the first data value, a first set of labels of the first set of edges, and a first set of entities of the dataset represented by the first set of entity vertices.

2. The system of claim 1,
   wherein the dataset comprises a plurality of entities, one or more properties associated with each entity, and one or more data values of the one or more properties, respectively,
   wherein the processing circuitry is further configured to generate the directed property graph based on the dataset and store the directed property graph in the first storage element, and
   wherein, to generate the directed property graph, the processing circuitry is further configured to (i) instantiate one entity vertex for each entity of the plurality of entities, and one value vertex for each unique data value of the dataset, and (ii) create one or more edges between each entity vertex and one or more value vertices having the corresponding one or more data values, with the one or more edges being indicative of the one or more properties associated with the corresponding entity vertex, respectively.

3. The system of claim 1, wherein the processing circuitry is further configured to identify, for each entity vertex of the first set of entity vertices, one or more additional value vertices coupled thereto by way of one or more additional edges, respectively, and wherein the response is generated further based on one or more labels associated with the one or more additional edges and one or more data values associated with the one or more additional value vertices, of each entity vertex of the first set of entity vertices, respectively.

4. The system of claim 1, wherein the value ID assigned to each unique data value is an encrypted version of the corresponding unique data value.

5. The system of claim 1, wherein the processing circuitry is further configured to:
   search the value index table to identify the first data value that matches the first reference value of the search query;
   determine a first value ID mapped to the first data value;
   search the vertex index table to identify the first value ID;
   determine a first vertex ID mapped to the first value ID; and
   search the directed property graph to identify the first value vertex having the first vertex ID.

6. The system of claim 1, wherein the first value vertex is in an encrypted format, wherein in the vertex index table, each vertex ID is further mapped to a decryption technique associated with the corresponding value vertex, and wherein the processing circuitry is further configured to identify a first decryption technique mapped to a first vertex ID of the first value vertex in the vertex index table and decrypt the first value vertex using the first decryption technique to obtain the first data value thereof.

7. The system of claim 1, wherein the processing circuitry is further configured to:
   identify, for each entity vertex of the first set of entity vertices, one or more additional value vertices coupled thereto by way of one or more additional edges, respectively, wherein the one or more additional value vertices are in an encrypted format;
   search the vertex index table to identify one or more vertex IDs of the one or more additional value vertices, respectively, wherein in the vertex index table, each vertex ID is further mapped to a decryption technique associated with the corresponding value vertex;
   determine one or more decryption techniques and one or more value IDs mapped to the one or more vertex IDs, respectively; and
   decrypt the one or more additional value vertices to obtain one or more data values thereof based on the one or more value IDs and the one or more decryption techniques, respectively, wherein the response is generated further based on one or more labels associated with the one or more additional edges and the one or more data values associated with the one or more additional value vertices, of each entity vertex of the first set of entity vertices, respectively.

8. The system of claim 1, wherein the processing circuitry is further configured to:
  identify, for each entity vertex of the first set of entity vertices, one or more additional value vertices coupled thereto by way of one or more additional edges, respectively, wherein the one or more additional value vertices are in encrypted format;
  search the vertex index table to identify one or more vertex IDs of the one or more additional value vertices, respectively;
  determine one or more value IDs mapped to the one or more vertex IDs, respectively;
  search the value index table to identify the one or more value IDs; and
  determine one or more data values mapped to the one or more value IDs, respectively, wherein the response is further generated based on one or more labels associated with the one or more additional edges and the one or more data values associated with the one or more additional value vertices, of each entity vertex of the first set of entity vertices, respectively.

9. The system of claim 1, wherein the processing circuitry is further configured to:
  identify, based on the search query, a second value vertex in conjunction with the first value vertex; and
  track (i) a second set of edges, of the plurality of edges, coupled to the second value vertex and (ii) a second set of entity vertices, of the plurality of entity vertices, coupled to the second value vertex by way of the second set of edges, wherein the processing circuitry generates the response further based on a second set of labels of the second set of edges and a second set of entities of the dataset represented by the second set of entity vertices.

10. The system of claim 9, wherein the response corresponds to an output of a database operation executed on (i) the first set of labels and the first set of entities and (ii) the second set of labels and the second set of entities.

11. The system of claim 9,
  wherein the search query further comprises a similarity indicator to indicate that the search is to be executed for the first reference value and at least one data value that is similar to the first reference value,
  wherein in the value index table, each unique data value of the directed property graph and the associated value ID are further mapped to a similarity code assigned thereto, where an identical similarity code of two or more data values is indicative of similarity therebetween,
  wherein the second value vertex is similar to the first value vertex such that the second value vertex has a second data value that is similar to the first data value, and
  wherein the processing circuitry identifies the second value vertex based on the value index table and the vertex index table.

12. The system of claim 11, wherein the processing circuitry is further configured to:
  search the value index table to identify the first data value that matches the first reference value of the search query;
  determine a first similarity code mapped to the first data value;
  detect, in the value index table, the second data value that has the first similarity code mapped thereto;
  determine a first value ID mapped to the first data value and a second value ID mapped to the second data value;
  search the vertex index table to identify the first value ID and the second value ID;
  determine a first vertex ID mapped to the first value ID and a second vertex ID mapped to the second value ID; and
  search the directed property graph to identify the first value vertex having the first vertex ID and the second value vertex having the second vertex ID.

13. The system of claim 9,
  wherein the first reference value comprises a data string and a wildcard string, and
  wherein the processing circuitry is further configured to:
    search the value index table to identify the first data value and a second data value of the second value vertex such that a first string of the first data value and a second string of the second data value match the data string of the first reference value;
    determine a first value ID mapped to the first data value and a second value ID mapped to the second data value;
    search the vertex index table to identify the first value ID and the second value ID;
    determine a first vertex ID mapped to the first value ID and a second vertex ID mapped to the second value ID; and
    search the directed property graph to identify the first value vertex having the first vertex ID and the second value vertex having the second vertex ID.

14. The system of claim 9,
  wherein the search query further comprises a second reference value, and
  wherein the processing circuitry is further configured to:
    search the value index table to identify the first data value and a second data value of the second value vertex such that the first data value and the second data value match the first reference value and the second reference value, respectively;
    determine a first value ID mapped to the first data value and a second value ID mapped to the second data value;
    search the vertex index table to identify the first value ID and the second value ID;
    determine a first vertex ID mapped to the first value ID and a second vertex ID mapped to the second value ID; and
    search the directed property graph to identify the first value vertex having the first vertex ID and the second value vertex having the second vertex ID.

15. The system of claim 9,
  wherein the search query further comprises a hint associated with the first reference value,
  wherein the processing circuitry is further configured to (i) identify, from the first set of edges and the second set of edges, a first subset of edges and a second subset of edges that are associated with the hint, respectively, and (ii) identify, from the first set of entity vertices and the second set of entity vertices, a first subset of entity vertices and a second subset of entity vertices that are coupled to the first subset of edges and the second subset of edges, respectively, and
  wherein the response is generated based on (i) a first subset of labels, of the first set of labels, associated with the first subset of edges, (ii) a first subset of entities, of the first set of entities, represented by the first subset of entity vertices, (iii) a second subset of labels, of the second set of labels, associated with the second subset of edges, and (iv) a second subset of entities, of the second set of entities, represented by the second subset of entity vertices.

16. The system of claim 15, wherein the response corresponds to an output of a database operation executed on (i) the first subset of labels and the first subset of entities and (ii) the second subset of labels and the second subset of entities.

17. The system of claim 1, wherein the value index table and the vertex index table are encrypted, and wherein the processing circuitry is further configured to decrypt the value index table and the vertex index table before searching the value index table and the vertex index table.

18. The system of claim 1, wherein the first storage element, the second storage element, and the third storage element correspond to decentralized data storages.

19. The system of claim 1, wherein the first value vertex comprises metadata that is a descriptor of the first data value, and wherein the response for the search query is generated further based on the metadata of the first value vertex.

* * * * *